March 15, 1960 V. FINSTON ET AL 2,928,402

ELECTROPROCESSING APPARATUS

Filed June 23, 1955 11 Sheets-Sheet 1

Inventors
Victor Finston
Walter Kostner by Hill, Sherman, Meroni, Gross & Simpson Attys

March 15, 1960 V. FINSTON ET AL 2,928,402

ELECTROPROCESSING APPARATUS

Filed June 23, 1955 11 Sheets-Sheet 2

Inventors
Victor Finston
Walter Kostner

By Hill, Sherman, Meroni, Gross & Simpson Attys

March 15, 1960 V. FINSTON ET AL 2,928,402

ELECTROPROCESSING APPARATUS

Filed June 23, 1955 11 Sheets-Sheet 3

Inventors
Victor Finston
Walter Kostner by Hill, Sherman, Meroni, Gross & Simpson Attys Inventors
Victor Finston
Walter Kostner
By Hill, Sherman, Meroni, Gross & Simpson Attys March 15, 1960 V. FINSTON ET AL 2,928,402

ELECTROPROCESSING APPARATUS

Filed June 23, 1955 11 Sheets-Sheet 5

Inventors
Victor Finston
Walter Kostner

By Hill, Sherman, Meroni, Gross & Simpson Attys

Inventors
Victor Finston
Walter Kostner
By Hill, Sherman, Meroni, Gross & Simpson Attys

ELECTROPROCESSING APPARATUS

Filed June 23, 1955 11 Sheets-Sheet 7

Inventors
Victor Finston
Walter Kostner

By Hill, Sherman, Meroni, Gross & Simpson Attys

March 15, 1960 V. FINSTON ET AL 2,928,402

ELECTROPROCESSING APPARATUS

Filed June 23, 1955 11 Sheets-Sheet 8

Inventors
Victor Finston
Walter Kostner
By Hill, Sherman, Meroni, Gross & Simpson Attys Inventors
Victor Finston
Walter Kostner
by Hill, Sherman, Meroni, Gross & Simpson Attys Inventors
Victor Finston
Walter Kostner
By Hill, Sherman, Meroni, Gross & Simpson Attys Inventors
Victor Finston
Walter Kostner
By Hill, Sherman, Meroni, Gross & Simpson Attys United States Patent Office 2,928,402

Patented Mar. 15, 1960

2,928,402

ELECTROPROCESSING APPARATUS

Victor Finston and Walter Kostner, Chicago, Ill., assignors to The Meaker Company, Chicago, Ill., a corporation of Illinois Application June 23, 1955, Serial No. 517,454

26 Claims. (Cl. 134—76)

This invention relates to apparatus for immersing articles in a series of treatment baths, and particularly to apparatus for automatically conveying and immersing articles in a series of electro-processing treatment baths.

It is an object of the present invention to provide an apparatus in which work units are transported intermittently and in unison between successive treatment baths and are immersed in such baths for relatively short periods, and are thereafter immersed in a selected one of a plurality of other treatment baths for a relatively long period, subsequent work units being automatically immersed in others of said long period treatment baths at predetermined intervals.

It is a further object of the present invention to provide an apparatus in which a shuttle operates at a fixed level above a plurality of treatment baths and an elongated continuous track is movable to lower the work units into a plurality of baths and to raise the work units for shifting by the shuttle to the next succeeding baths.

It is another object of the present invention to provide novel means for shifting work units from a section of short period treatment baths to a section of long period treatment baths.

It is still another object of the present invention to provide novel means for transferring work units from a section of long period treatment baths to a section of short period treatment baths.

It is a further object of the present invention to provide an apparatus in which a conveyor operates to shift work units between successive treatment baths, and automatic latching and unlatching means is provided to retain work units aligned with the respective baths as the work is lowered from engagement with the conveyor into the baths and to release the work units for shifting by the conveyor as the work is raised from the baths.

It is a still further object of the present invention to provide an apparatus in which work units are transmitted to selected ones of a plurality of baths along a track having movable sections aligned with the respective baths, the work units being lowered into the selected baths by lowering of the respective movable sections aligned therewith.

It is another and further object of the present invention to provide a novel method and means for treating work in a plurality of first treatment baths for a relatively short period, and for thereafter treating work in a further bath for a relatively long period.

It is still another object of the present invention to provide an apparatus in which work units are moved to selected ones of a plurality of baths over a track having movable sections aligned with the respective baths wherein an auxiliary track section automatically replaces the movable section as the work is lowered into the selected bath by means of the associated movable section.

It is yet another object of the present invention to provide an apparatus for moving work units intermittently through a series of relatively short period treatment baths and for thereafter transferring the work units to selected ones of a plurality of long period treatment baths.

It is a further object of the present invention to provide safety means for retaining control of said work as it is transferred from short period to long period treatment baths and from long period to short period treatment baths.

Other and further important objects, features and advantages of the present invention will be readily apparent from the following detailed description of one specific embodiment thereof, disclosed by way of example, in conjunction with the accompanying drawings.

On the drawings:

Figures 1*a*, *b*, *c*, and *d* illustrate diagrammatically the layout of the illustrated embodiment in top plan, successive figures representing successive portions of the machine in the direction of travel of work therethrough;

Figures 2*a*, *b*, *c* and *d* represent schematically corresponding portions of the machine in elevation;

Figure 1A:
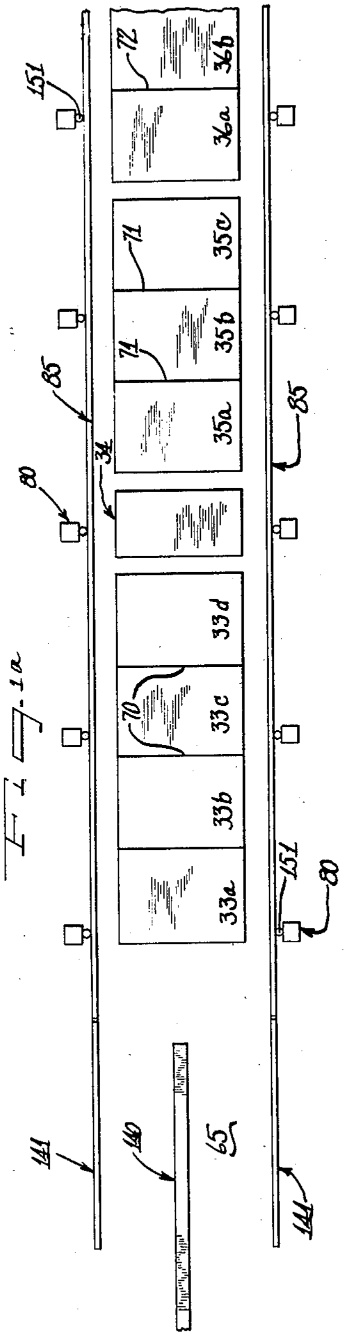

Employing like characters to designate corresponding parts throughout, the apparatus includes tanks set upon a stationary framework and standing adjacent one another in a straight line series. By way of example only, the tanks have been illustrated diagrammatically in Figures 1*a–d* and 2*a–d*, as they might be arranged in a copper-nickel-chrome plating machine for plating automobile bumpers.

The tanks in sequence may comprise:

Soak clean units 33*a–d*,
Warm water power spray unit 34,
Power wash units 35*a–c*,
Cathodic clean units 36*a–c*,
Cold water rinse unit 37,
Acid dip unit 38,
Cold water rinse unit 39,
Cyanide dip unit 40,
Cyanide copper strike units 41*a–d*,
Recovery rinse unit 42,
Cold water rinse unit 43,
Cold water rinse unit 44,
Acid dip unit 45,
16 acid copper plate units 46*a–p*,
Recovery rinse unit 47,
Cold water rinse unit 48,
Cold water rinse unit 49,
Nickel strike unit 50,
16 nickel plate units 51*a–p*,
Recovery rinse unit 52,
Cold water rinse unit 53,
Cold water rinse unit 54,
Acid dip unit 55,
Cold water rinse unit 56,
Hot rinse unit 57,
Chrome plate units 58*a–b*,
Recovery rinse unit 59,
Cold water rinse unit 60,
Cold water rinse unit 61,
Hot water rinse unit 62,
Hot air blow off unit 63.

A loading station 65 and unloading station 66 are conveniently located just before tank 33*a* and just after tank 63, respectively. Partitions 70–76 serve to separate adjacent units in tank sections 33, 35, 36, 41, 46, 51 and 58. Other sequences and other types of treatment baths may, of course, be employed depending on the application of the apparatus.

As indicated in Figures 1 and 2, a framework extends along either side of the series of tanks including a number of vertical columns 80 having their upper ends joined by longitudinal girders 81. In general, continuous horizontal tracks 85 may extend along the entire precleaning section including tanks 33 through 45. These tracks are movable from an upper position in which the work travels above the tanks to a lower position in which the work is immersed in the tanks. The sequence of operation may be arranged in this section so that the work remains in each of the cells of the section for a period of 75 seconds. Shuttle means, indicated diagrammatically in Figures 2*a* and 2*b* at 86, is provided for shifting the work from cell-to-cell through the section. The drive for the shuttle is indicated diagrammatically at 87, and it will be understood that the shuttle 86 is driven forwardly while the tracks 85 are in their upper position and that the shuttle is retracted during the period when the tracks 85 are in their lower position with the work immersed in the tanks.

In the copper plating section 46, the work is moved to a selected one of the 16 cells and is immersed therein for a period of 30 minutes, for example. This is accomplished by means of a pusher mechanism 89 which operates to move successive units of work along tracks 90 to successive cells 46*a–p* in sequence. Thus, the plating section 46 may receive a unit of work from the precleaning section every two minutes and after the 16 cells have been supplied with work, the first of the work units will have remained in its cell for 30 minutes and will be ready for transfer to the second cleaning section including tanks 47–50. Thus, while a given unit of work will be immersed in each of the cells of the precleaning section, it will be immersed in only one of the cells of the plating section.

In the second cleaning section, the tracks 97 carry the work in a manner similar to the tracks 85 in the precleaning section, and the work is moved between the successive cells by means of the shuttle 91 operated by the drive 92. Similarly, the pusher mechanism 94 conveys the work to the selected cell in the nickel plating section 51 along tracks 98, and the shuttle 95 and drive 96 move the work along tracks 99 through the final cleaning section including tanks 52–63.

Figure 3:
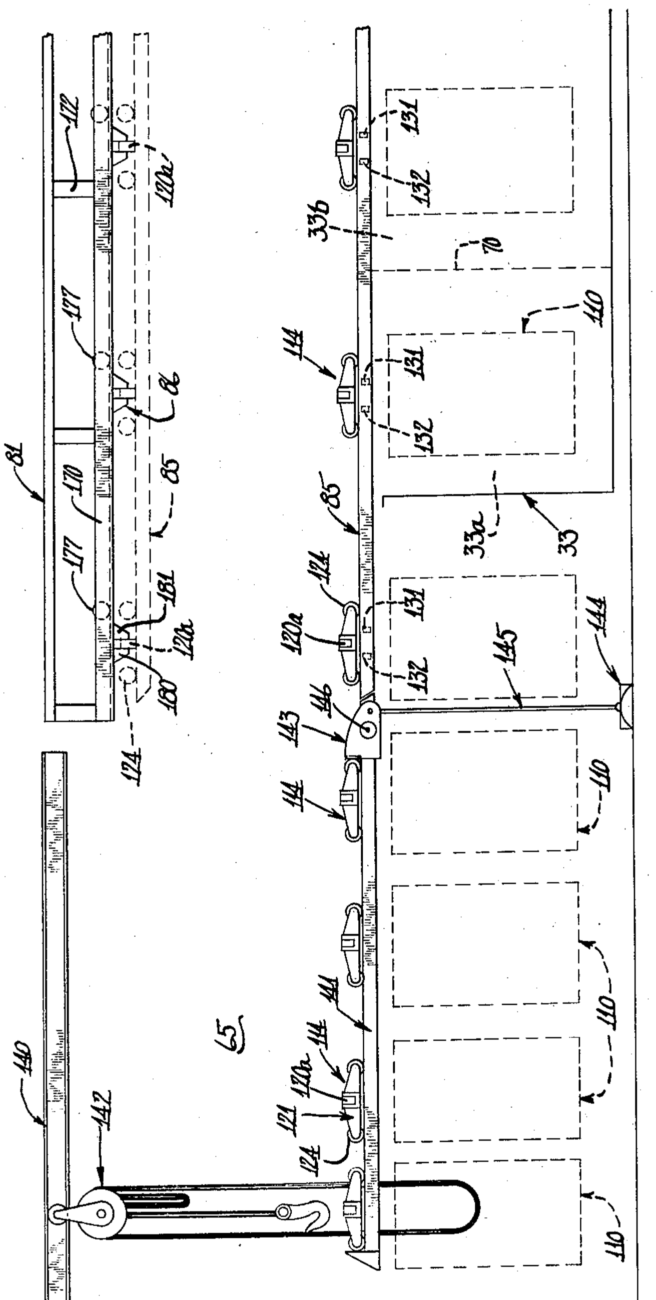
Figure 3 is an enlarged partially diagrammatic side elevational view illustrating the delivery of work carriers into the first cleaning section of the machine.
Figures 6, 7:
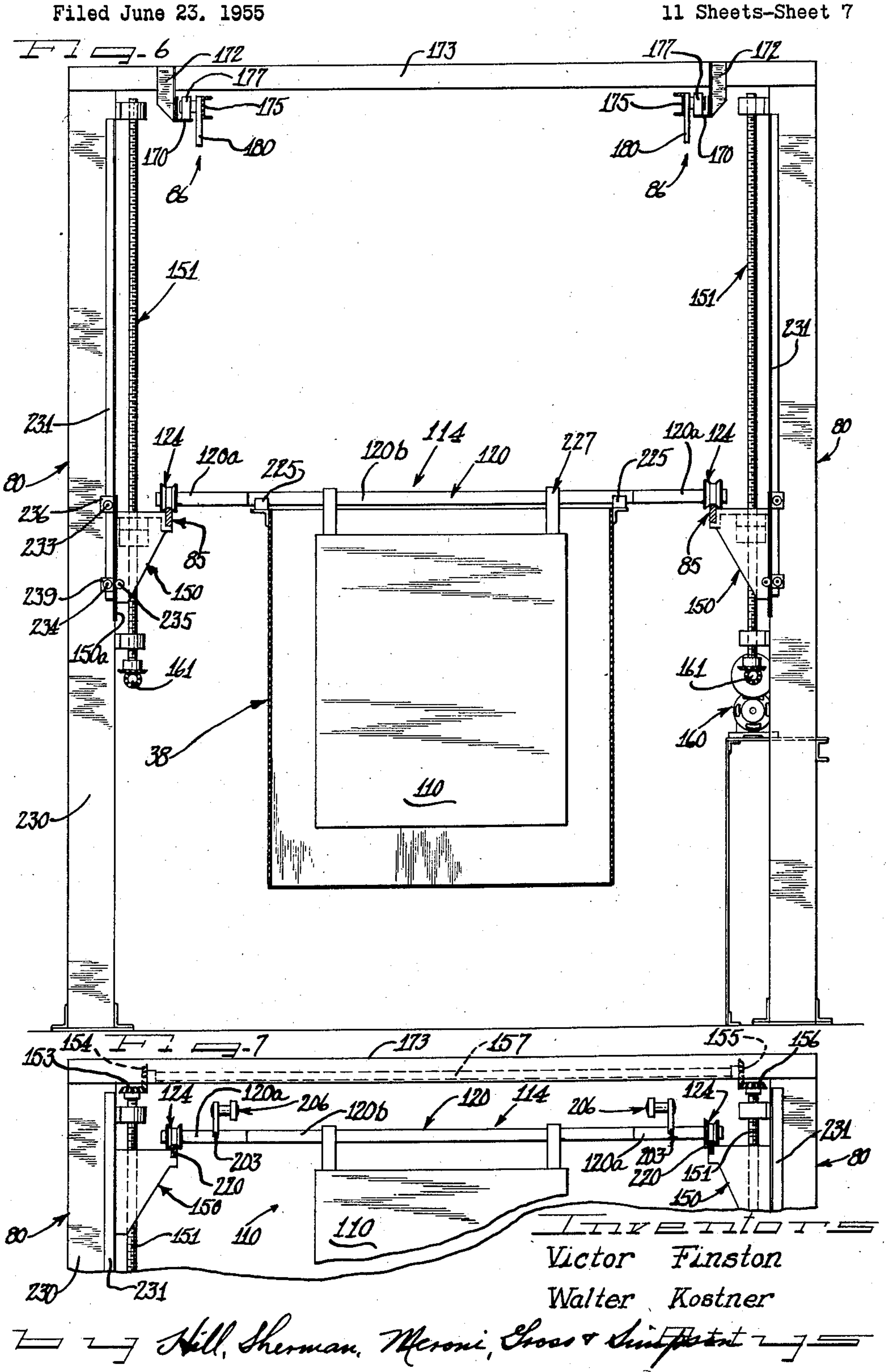
Figure 6 is a transverse sectional view taken substantially along line VI—VI of Figure 1*b* and illustrating somewhat diagrammatically the manner in which the work is lowered into a treatment bath of the cleaning section.
Figure 7 is a vertical cross-sectional view similar to Figure 6 but illustrating the work in raised position in the copper plating section of the machine.

The work indicated diagrammatically at 110 in Figures 3 and 6 may consist of a rack of automobile bumpers, the bumpers being generally of C-shape and arranged in a pair of columns with the ends of the bumpers of one column opposed to the ends of the bumpers of the other column. As indicated in Figure 1*c*, anodes 112 may be of generally C-shape for conforming to the outer surfaces of the bumpers to be plated. It will be understood that when the work is to be lowered into a bath having conforming anodes, the work must be precisely positioned in the bath, and must not sway or the like as it is lowered into the bath.

*Carriers*

Figure 2A:
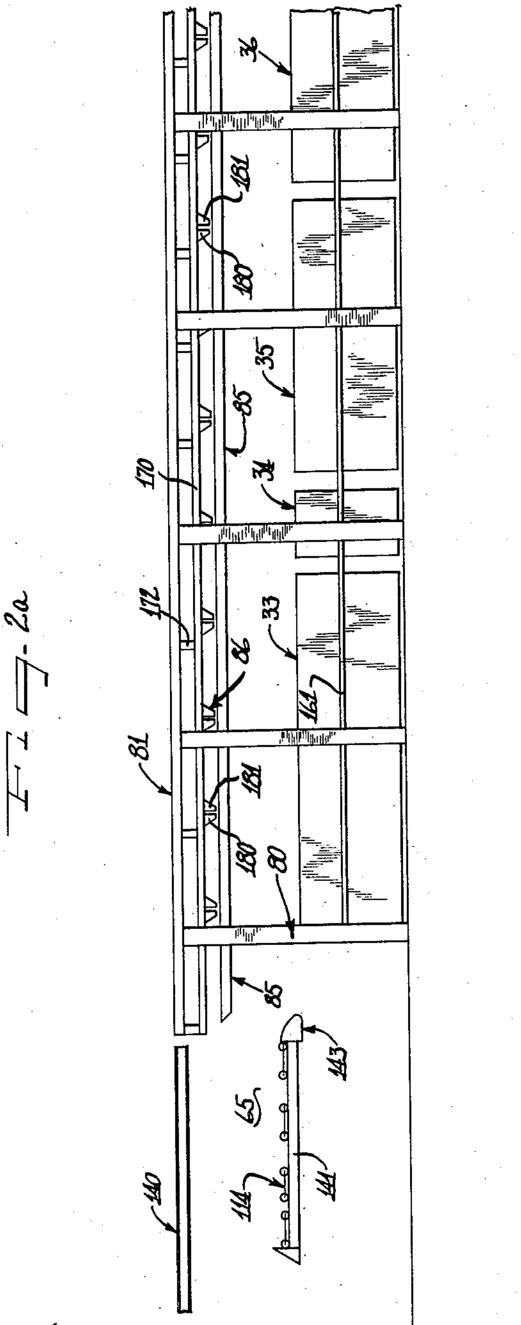
Figure 1B:
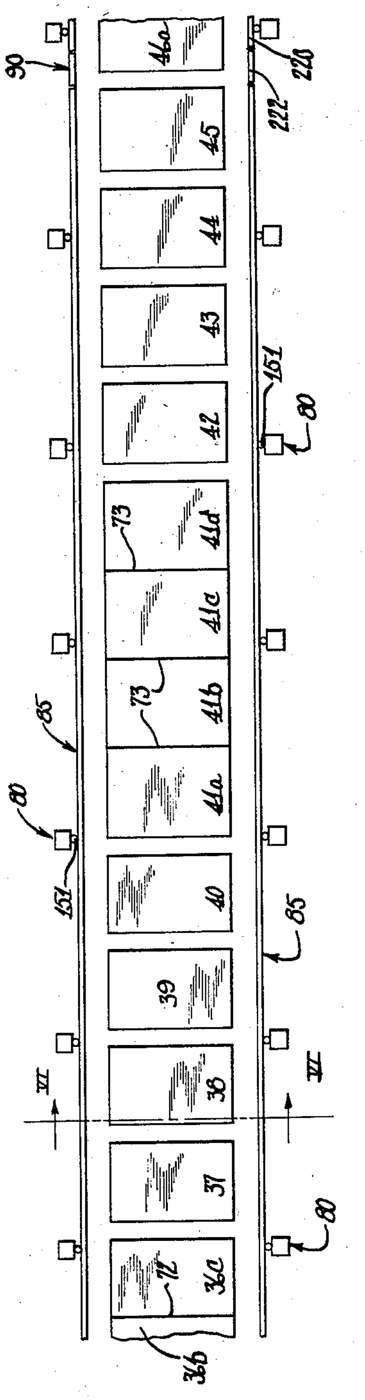
Figure 2B:
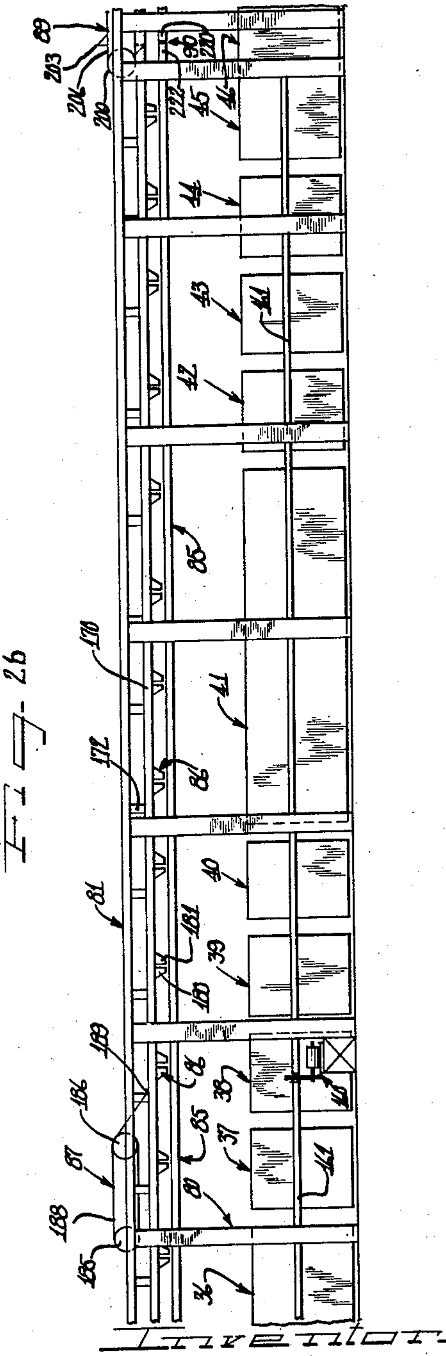
Figure 2C:
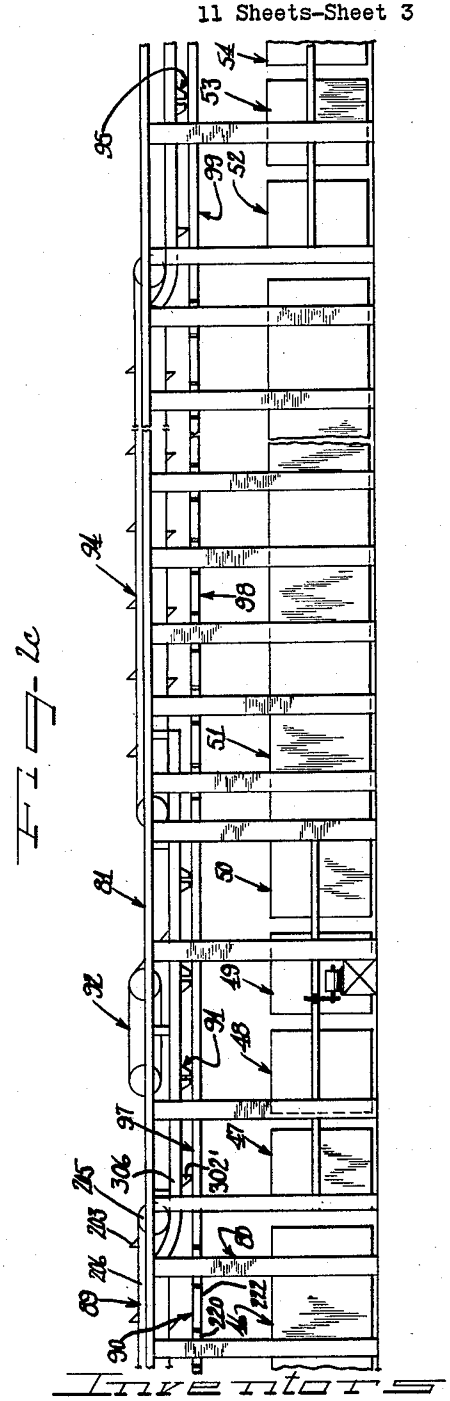
Figure 1D:
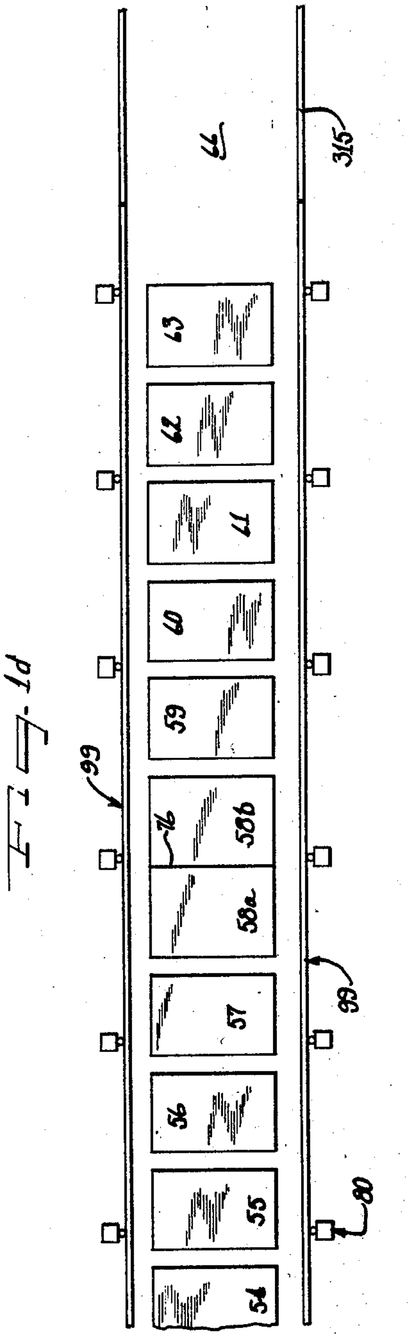
Figure 2D:
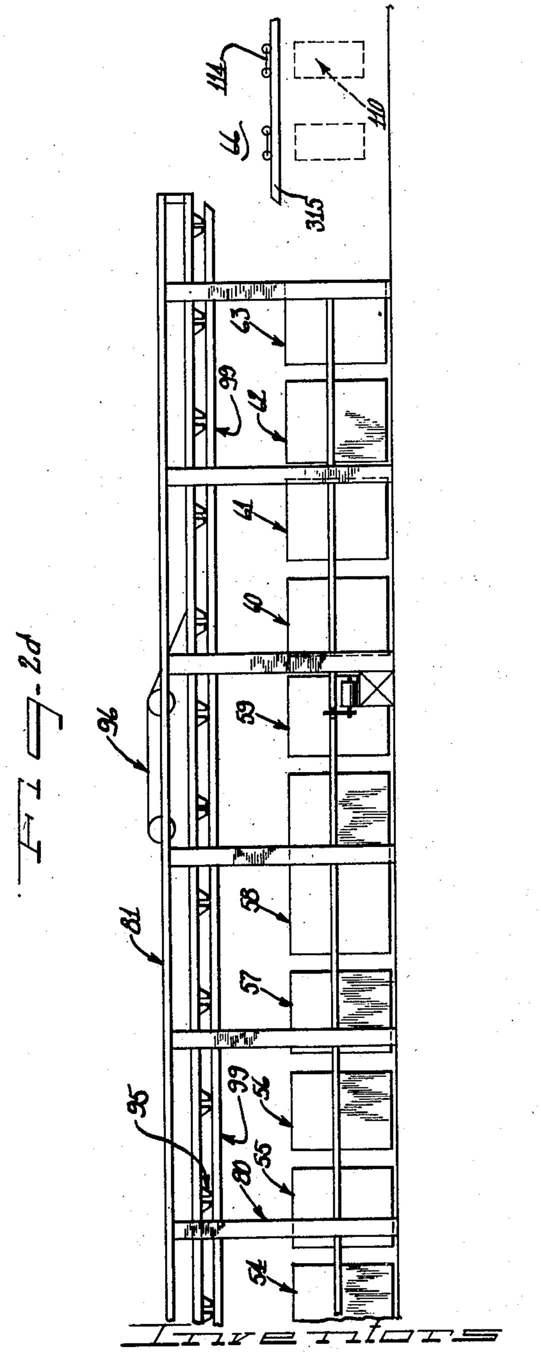
Figure 4:
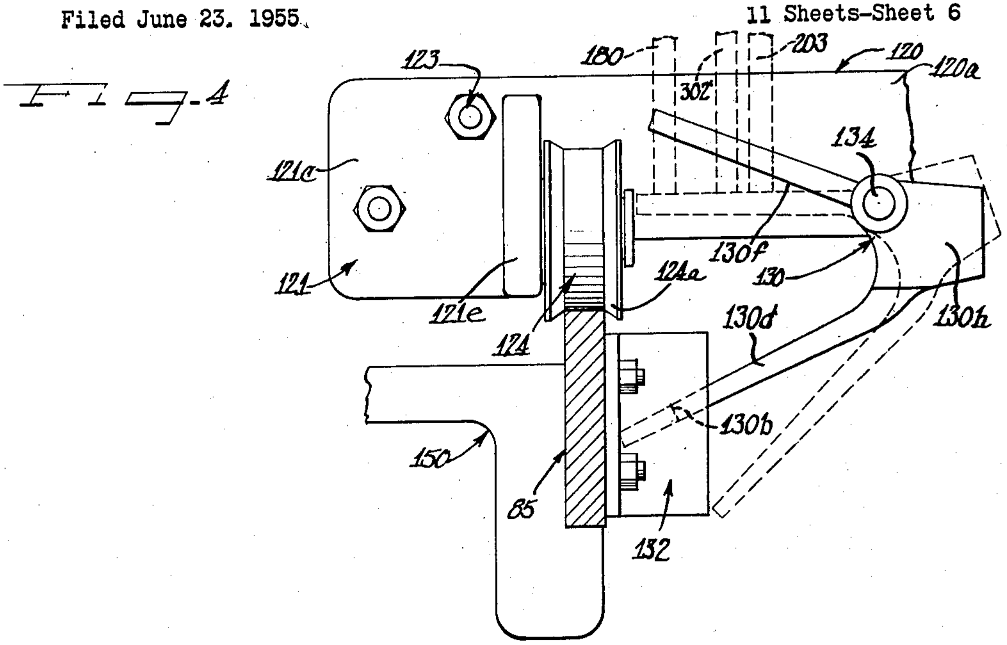
Figure 4 is a fragmentary transverse sectional view illustrating schematically the operation of the carrier positioning locks.
Figure 5:
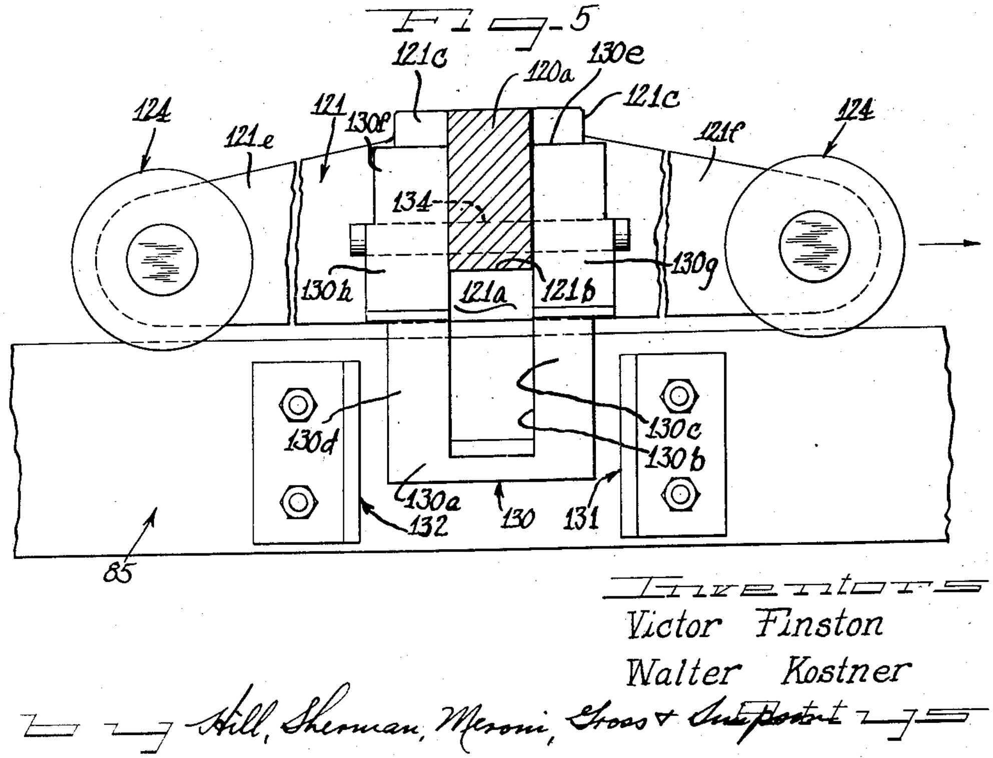
Figure 5 is a fragmentary longitudinal sectional view illustrating the carrier positioning lock of Figure 4.

The carriers for the work 110 are indicated diagrammatically at 114 in Figures 2*a*, 2*d* and 3, and are shown in greater detail in Figures 4, 5 and 6. The carriers consist essentially of movable bridge members for transporting the work through the full automatic plating machine along the tracks 85, 90, 97, 98 and 99.

As indicated in Figure 6, each carrier includes a structure 120 spanning between the tracks which are associated with the respective columns 80 on either side of the tanks. As seen in Figures 4 and 5, this spanning structure 120 may include gudgeon pieces 120*a* of generally rectangular cross-section for cooperating with the various conveying means such as the shuttle 86, Figure 2*a*. The gudgeons 120*a* at each side of each of the carriers have a bracket 121 secured thereto, Figure 4. Each bracket includes a central portion 121*a*, Figure 5, having a rectangular notch 121*b* therein for receiving an end of a gudgeon 120*a*. Bracket side portions 121*c* are secured to the outer end of the gudgeon 120*a* by means of bolts 123, Figure 4, extending through the opposed sides 121*c* and through the gudgeon therebetween. The bracket 121 includes legs 121*e* and 121*f* extending along the track 85 and supporting rollers 124 which in turn ride on the track 85.

The rollers may be equipped with antifriction bearings, and may be mounted a substantial distance apart, such as two feet, to eliminate any possible pendulum effect of the suspended work between the two set of rollers. This action might otherwise occur when the carrier is suddenly stopped or started while in the process of being transferred through the machine. The pendulum effect is especially objectionable when a work laden carrier is being lowered into a cell containing conforming anodes such as indicated at 112 in Figure 1*c*. As seen seen in Figure 4, the rollers 124 may be provided with flanges 124*a* for retaining the rollers on the tracks. The work 110 is preferably rigidly secured with the spanning structure 120 of the carrier to further prevent swaying during movement of the work through the machine.

For positioning the carriers at preselected positions along the tracks, as seen in Figures 4 and 5, the carrier gudgeons 120*a* each has a carrier positioning lock 130 associated therewith and the tracks carry pairs of brackets 131, 132, Figure 5. As indicated in Figure 3, each pair of brackets 131, 132 except the first pair is aligned centrally of one of the tanks 33*a*, 33*b*, etc. The positioning locks 130 thus prevent movement of the work along the tracks as the work is being lowered into the various tanks. The positioning locks may each have a central recess 130*b* for receiving a gudgeon 120*a*, side portions 130*c* and 130*d* straddling the gudgeon and being pivotally secured thereto by means of a shaft 134. The side portions 130*c* and 130*d* are provided with extensions 130*e* and 130*f* as shown in Figures 4 and 5. The lower portion 130*a* of the carrier positioning lock engages between brackets 131, 132 to prevent movement of the carrier along the track 85. The extension 130*f* cooperates with the shuttle 86 and other conveyors in a manner which will hereinafter be described to disengage the positioning locks when the carriers are to be moved along the tracks.

Because of the small scale and diagrammatic nature of Figures 6 and 7 the carrier positioning locks 130 are not illustrated, but it will be understood that the parts are proportioned generally as indicated in Figures 4 and 5 so that the carrier locks will operate as described.

Figure 1C:
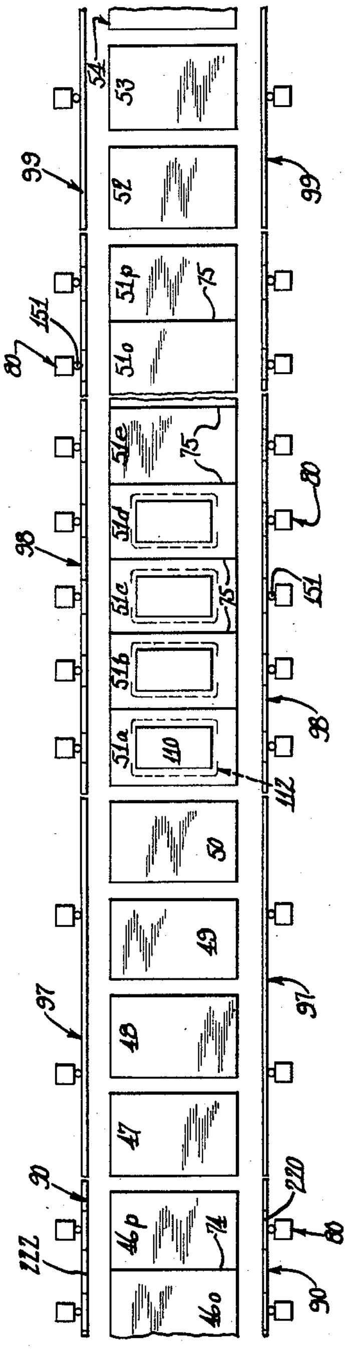

As illustrated in Figures 1*a* and 2*a*, and in more detail in Figure 3, the carriers may be transported on an overhead monorail system 140 to the loading section 65 of the machine and deposited upon the fixed rails 141 by means of the hoist-hook arrangement 142. By way of example, four loaded carriers 114 may be accommodated on the rails 141. Since the plating machine will accept a carrier every two minutes in the illustrated embodiment, the machine may thus be preloaded with eight minutes of work. When the movable rails 85 are in their lower position illustrated in Figure 3 in solid outline, a foot pedal 144 and link 145 may be actuated to pivot a stop 143 about a pin 146, to release the first of the four carriers on the rails 141 for movement onto the tracks 85. It will be understood that there is a pair of brackets 131, 132 on the end of each of the rails 85 adjacent the stop 143, and that the carrier-positioning lock 130 (Figure 4) on each side of the carrier will be engaged with a pair of brackets 131, 132 to fix the position of the carrier being loaded on the rails 85. This positioning of the carrier being loaded is accomplished by manually pivoting the portion 130*a* of each positioning lock inwardly about shaft 134 to clear the bracket 132. The portion 130*a* is designed to be moved by action of gravity to its locking position between the brackets 132 and 131 and counter weight means which as indicated at 130*g* and 130*h* may be provided to insure this action. When the rails 85 are subsequently raised, the shuttle 86 is operative to disengage the locks 130 and to move the carrier over the first cell 33*a* of the precleaning section.

*Precleaning section*

As mentioned previously, the precleaning section may include tanks 33 to 45 as illustrated in Figures 1*a* and 1*b*, and 2*a* and 2*b*, and may have movable rails 85 running continuously and parallel along the entire length of the section, one on either side of the tanks. As illustrated in Figure 6, the rails 85 may be mounted by large nut castings 150 which are moved vertically by means of screws 151 located at each column 80. Both movable rails 85 operate together and simultaneously, being mechanically tied together with suitable gears and shafts, similar to the gears 153–156 and shaft 157 illustrated in Figure 7, and being driven from a common electric motor indicated diagrammatically at 160, Figure 6. The vertical screws 151 associated with the various columns 80 are linked together by means of horizontal shafts 161 indicated diagrammatically in Figures 2*a* and 2*b*, and shown in Figure 6.

Figures 16, 17:
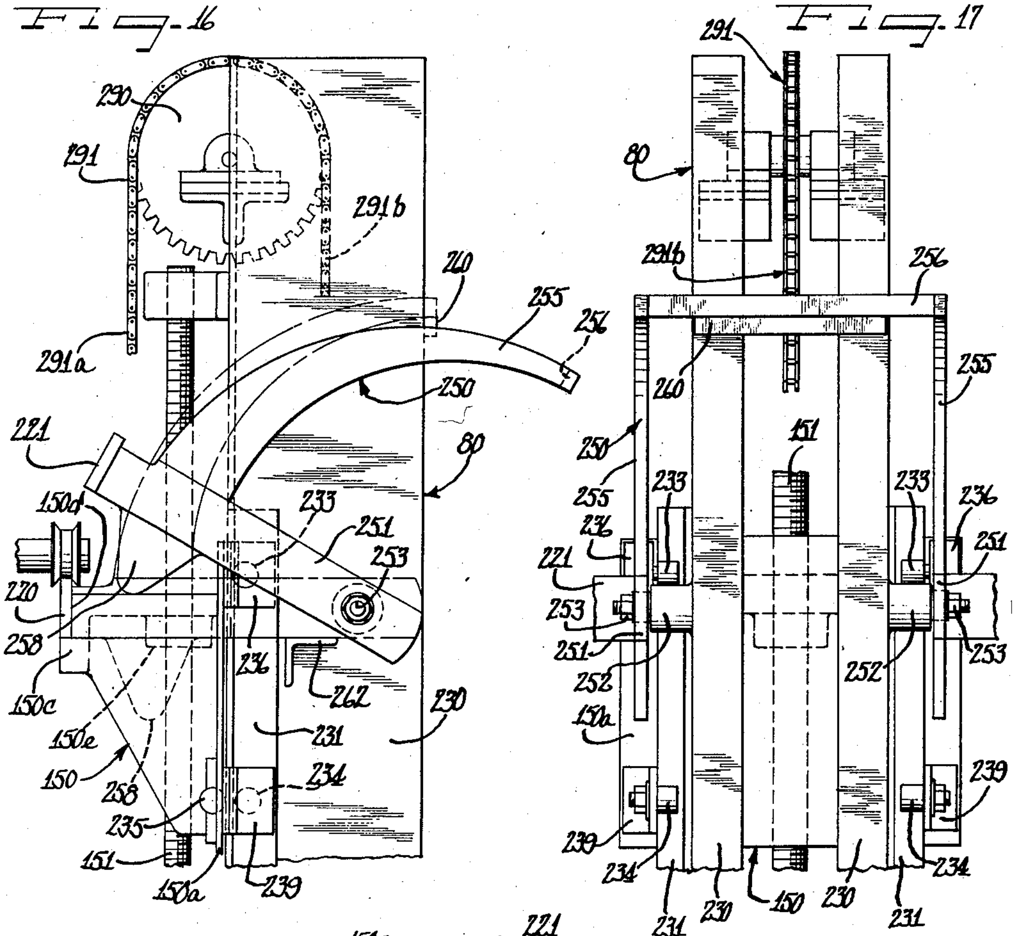
Figure 16 is a fragmentary side elevational view illustrating the operation of the auxiliary track sections in the copper plating section of the machine.
Figure 17 is a fragmentary front elevational view of the structure of Figure 16.
Figure 18:
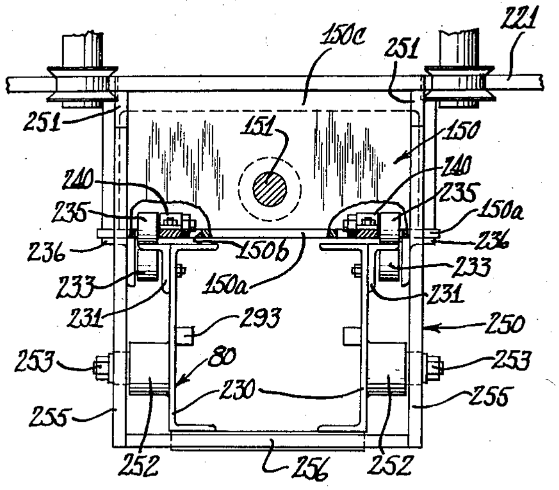
Figure 18 is a fragmentary top plan view of the structure of Figure 16.

The details of the columns 80 and nuts 150 are illustrated in Figures 16, 17 and 18 and will be described in connection therewith hereinafter.

As illustrated in Figures 3 and 6, the shuttle 86 for conveying the carriers along the precleaning section may travel on fixed rails 170. As illustrated in Figure 6, the rails 170 are supported by hangers 172 depending from cross beams 173 of the framework of the machine. The shuttle includes channels 175 running the entire length of the precleaning section and supported from the tracks 170 by means of rollers 177. As best seen in Figure 3, the channels 175 carry pairs of pusher lugs 180 and 181 at spaced intervals therealong the intervals between pairs corresponding to the spacing between the tanks. As indicated in dash outline in Figure 3, as the rails 85 are raised to their upper position, the gudgeons 120*a* of the carrier are arranged to move between the pusher lugs 180 and 181 to couple the carriers with the shuttle. As indicated in dash outline in Figure 4, as the gudgeons 120*a* move into coupling relation to the pusher lugs 180 and 181, the pusher lug 180, for example, will contact the extension 130*f* of the carrier positioning lock 130 and swing the lock into disengaged position, in which position the arm 130*a* clears the brackets 131 and 132 so that the carrier may be moved along the rails 85 by means of the shuttle.

The shuttle 86 operates with a reciprocating motion and each rail 175 thereof may be driven by means of a pair of chain sprockets 185 and 186, Figure 2*b*, mounted with the outside to outside distance between the sprockets equal to the distance between the center lines of successive cells in the precleaning section. A roller chain 188 encircles both sprockets, and attached to the chain is a crank 189 which is connetced to one of the rails 175 for reciprocating the same as the chain is moved about the sprockets. During one-half cycle of the crank 189, the shuttle will be moved in the direction of travel of work through the machine, while in the remaining half cycle of the crank the shuttle will return to its original position, moving in a direction opposite to the direction of travel of the work.

*Operation of precleaning section*

The operation of the precleaning section will now be readily understood and may be summarized as follows:

Referring to Figure 3, while the rails 85 are in the down position with the work 110 immersed in the various tanks of the precleaning section, the stop 143 is released and the first carrier in line on the fixed tracks 141 of the loading section 65 is rolled onto the ends of the tracks 85 overhanging beyond the first tank 33*a*. When the carrier is centered with respect to the brackets 132, 131, the carrier positioning latch 130 (Figure 4) is released between the brackets 131 and 132 to position the carrier on the rails 85. The rails 85 are then raised, the gudgeon 120*a* of the carrier being engaged between the pusher lugs 180 and 181 of the shuttle 86, and the carrier positioning lock 130 being disengaged by means of the pusher lugs as indicated in Figure 4.

The shuttle drive 87, Figure 2*b*, is then actuated to move the shuttle forwardly to position the work over the first tank 33*a*, and the motor 160, Figure 2*b*, is energized in the direction to lower the tracks 85, by means of the vertical screws 151 and the nuts 150, Figure 6. As the tracks 85 are lowered out of engagement with the shuttle, the carrier-positioning locks 130 are automatically engaged by the action of gravity to retain the carriers in fixed position along the track and aligned with the respective tanks. While the work is immersed in the various tanks, a further carrier is fed onto the forward end of the track 85 shown in Figure 3 and the cycle is repeated. It will be understood that the shuttle drive 87 is actuated to return the shuttle to the initial position shown in Figure 3 after the carriers have been lowered out of engagement therewith.

By way of example, the cycle of operation in the precleaning section may include a 15 second period during which the tracks 85 are being raised to their upper position, a 15 second dwell period during which the shuttle is operative to shift each of the carriers to the next succeeding cell, a 15 second descent period during which the work is lowered into the respective cells, and a 75 second dwell period in the down position during which the work is submerged in the various tanks and is being chemically acted upon, or otherwise treated, depending upon the tank in which the work has been submerged. It will thus be observed that, in this example, a 2 minute interval is provided between loading operations, and a 75 second period is provided for loading a new carrier onto the tracks 85. Thus, the carriers are moved in unison from cell to cell through the precleaning section, and a further carrier is added during each cycle, while a carrier having travelled through the precleaning section is discharged to the plating section each cycle. It will be apparent to those skilled in the art that the cycling of the elevating and conveying movements may be readily controlled by conventional timing means.

*Transfer from cleaning to plating*

Figure 8:
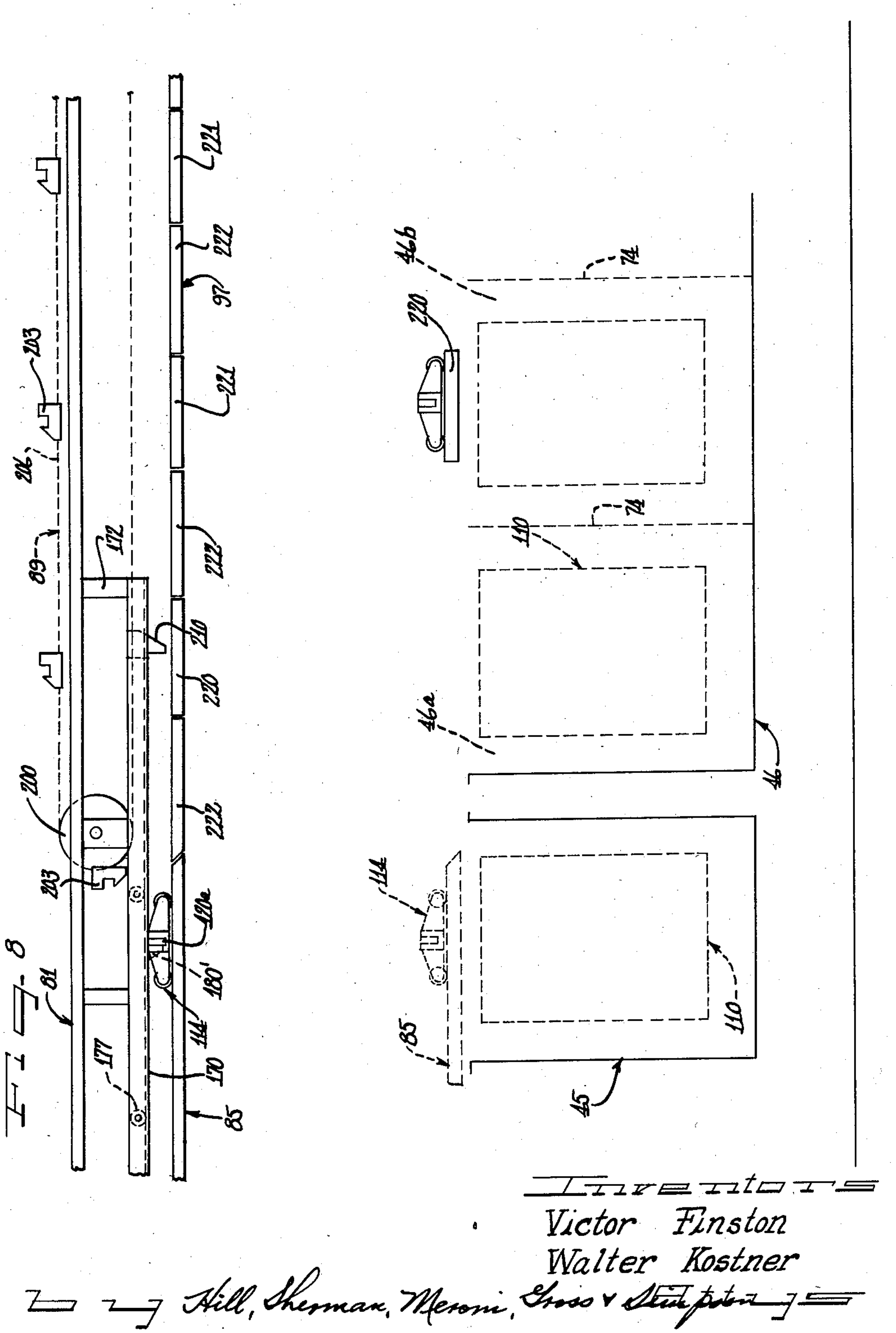
Figure 8 is a somewhat diagrammatic side elevational view illustrating the manner of transfer from the first cleaning section to the copper plating section.

The plating section consists of a tank 46 containing 16 cells **46*a*–46*p*, each cell being lined with a conforming anode such as the anodes 112** indicated in Figure 1*c*. Referring now to Figure 8, it will be observed that there is a carrier 114 in the "up" position on the movable rails 85 directly over tank 45, constituting the acid dip station. The pusher lug 180′ serves to release the carrier lock 130 in a manner similar to that indicated in Figure 4 for pusher lug 180. The inertia and friction of the carriers are such that the single lug 180′ will not lose control of the carrier positioning lock as the lug 180′ moves a carrier into the copper plating section.

When the shuttle 86 is driven in the direction of travel of the work, it will be observed that the last pusher lug 180′ will push the carrier shown in Figure 8 toward the copper plating section. When the carrier reaches a position directly below the center line of a sprocket 200 of the copper plating section conveyor 89, a latching lug 203 carried by the conveyor 89 begins to move in the same direction as the shuttle. Inasmuch as the latching lug 203 moves three times faster than the pusher lug 180′, latching lug 203 will engage the carrier with a latching action while it is still being pushed by pusher lug 180′. Since the pusher lug 180′ does not have a companion lug such as companion lug 181 for lug 180 in it will be appreciated that the latching lug 203 will be able to take control of the carrier by virtue of its superior velocity and latching ability.

Latching lug 203 will advance the carrier to a position directly over the first cell **46*a* of the plating tank before stopping. At this instant, pusher lug 180′ may be approximately 4 feet behind, for example, and may be travelling at approximately 32 feet per minute and will require a few seconds more to reach a position adjacent that occupied by the carrier and latching lug 203 over the first cell 46*a*. If the separation between cells in the precleaning section is 8 feet, the pusher lug 180′ will complete an 8 foot stroke due to its mechanical relationship with the other pusher lugs behind it, and if the separation between the last cell of the precleaning section and the first cell of the plating section is also 8 feet, the pusher lug 180′ will come to rest at a point over the center line of the tank 46*a***.

As indicated diagrammatically in Figures 2*b* and 2*c*, the copper plating conveyor 89 may consist of sprockets 200 and 205 having a chain 206 trained thereover and carrying the latching lugs 203 at spaced intervals.

Figures 9, 10, 11, 13:
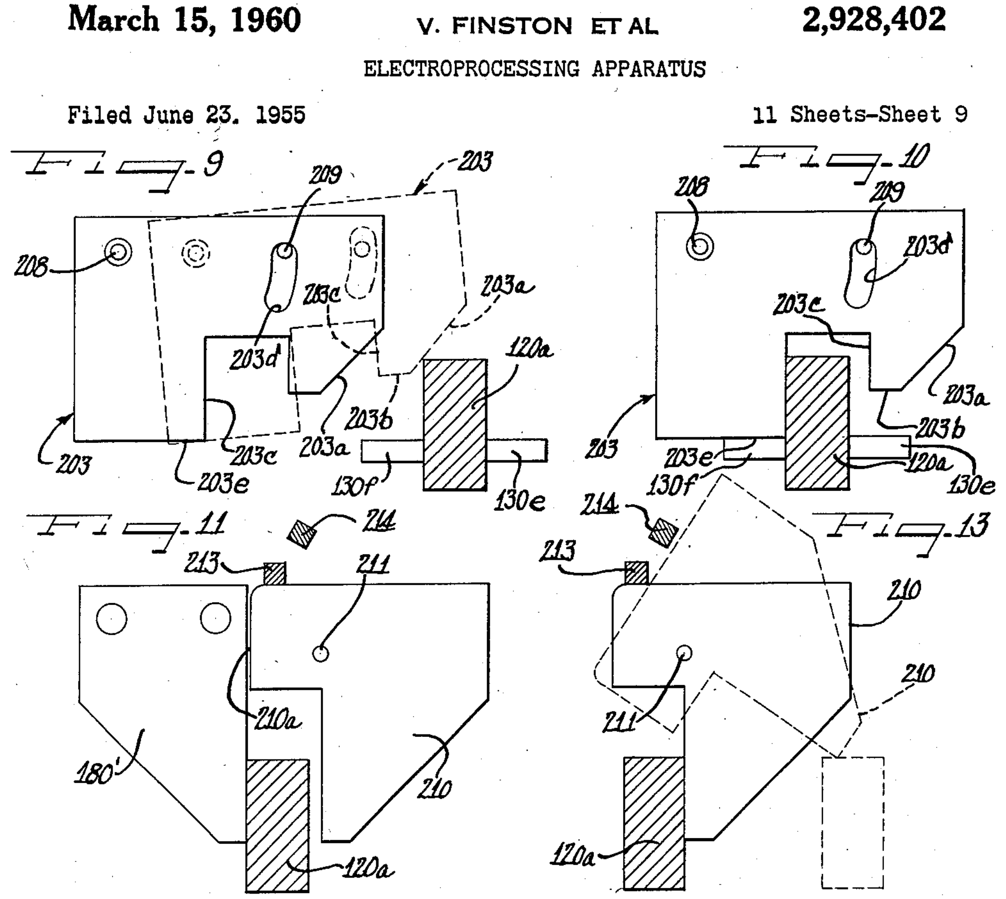
Figure 9 is a diagrammatic longitudinal sectional view illustrating the manner in which a latching lug takes control of a carrier.
Figure 10 is a view similar to Figure 9 but showing the latching lug in engagement with the carrier.
Figure 11 is a diagrammatic longitudinal sectional view illustrating the manner in which the locking lug cooperates with the last pusher lug of the first cleaning section.
Figure 13 is a diagrammatic longitudinal sectional view illustrating the manner in which the locking lug is normally by-passed.

The manner in which the latching lugs 203 engage the gudgeons **120*a* of a carrier is diagrammatically illustrated in Figures 9 and 10. The latching lug 203 is pivoted to the conveyor chain 206 at 208 and is limited in its pivotal movement by means of a pin 209 carried by the chain and riding in a slot 203*d* in the lug 203. As indicated in Figure 9 in dotted outline, as the lug 203 overtakes the carrier gudgeon 120*a*, the sloping surface 203*a* of the lug rides up the trailing upper edge of the gudgeon 120*a* to pivot the lug counterclockwise about pin 208. The portion 203*b* of the lug then travels over the top of the gudgeon and latches on the leading edge of the gudgeon by means of the recess 203*c* in the lug 203. The gudgeon 120*a* is then enggaed by the lug 203** as indicated in Figure 10.

Figures 12, 14:
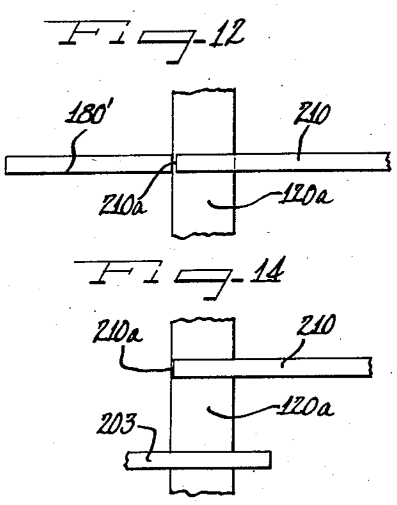
Figure 12 is a plan view of the diagrammatic showing of Figure 11.
Figure 14 is a diagrammatic plan view of the showing of Figure 13 and illustrating the manner in which the latching lug by-passes the locking lug.

It will be understood that the pusher lug 180′ maintains extension **130*f* in its down position (carrier lock in nonlatching position) as the latching lug 203 takes control, and that as the carrier moves away from pusher lug 180′, the surface 203*e* of latching lug 203 serves to retain extension 130*f* in down position and the carrier lock 130 in non-latching position. As indicated in Figures 12 and 14, latching lug 203 is spaced inwardly from lug 180′ so as to clear the same as the latching lug 203 takes control of the carrier. The position of the latching lug 203** relative to the carrier positioning lock is indicated diagrammatically in dotted outline in Figure 4.

As a safety feature for preventing loss of control of a carrier should the plating section conveyor not function, a locking lug 210 is provided at the end of the stroke of the pusher lug 180′, as shown in Figure 8. Thus, if the latching lug 203 fails to take control of the carrier, the carrier will continue to travel into the plating section under the impetus of the pusher lug 180′. Under these conditions, when the pusher lug 180′ reaches the end of its stroke, which may be over the center line of the first plating cell **46*a*, the carrier would continue to roll forward due to the absence of the compansion pusher lug 181. To prevent this loss of control of the carrier, as indicated in Figures 11 and 12, the locking lug 210 is arranged to oppose pusher lug 180′ in such a manner that the locking lug 210 is prevented from rotating out of the way of the gudgeon 120*a* when confronted by the pusher lug 180′. This relation will be readily understood from Figure 11, wherein it will be seen that in order for the gudgeon 120*a* to continue in the forward direction away from the pusher lug 180′, the locking lug 210 must be rotated about its pivot 211; however, it will be observed that the pusher lug 180′ by opposing the face 210*a* of the locking lug prevents such pivoting of the locking lug 210. The carrier will thus be locked in position by means of the pusher lug 180′ and locking lug 210**.

The normal operation of the locking lug 210 is indicated in Figures 13 and 14. It will be observed from Figure 14 that the latching lug 203 is displaced to one side of the locking lug 210 and does not confront the face **210*a* of the locking lug. It is therefore apparent that the locking lug will simply pivot on its mounting 211 to allow the latching lug to carry the gudgeon 120*a* to any selected point beyond the locking lug. Stops 213 and 214 limit pivoting movement of the locking lug 210, the stop 214** being arranged to ensure that the locking lug will return to its initial position by gravity after a carrier is moved past.

*Copper plating section*

As best seen in Figure 8, the rails 97 of the copper plating section differ from the rails 85 in the precleaning section in that a pair of short lengths of rail 220 is centered over each of the cells 46a–46p. These rail segments 220 are mounted between fixed pairs of rail segments 222 and are movable from an upper position as part of the rails 97 to a lower position which corresponds to the lower position of the rails 85 as shown in Figure 8 in conjunction with cell 46b. The rail segments 220 may be provided with carrier positioning brackets 131 and 132 as shown in Figure 5 and the carrier locks 130 may be released in the manner indicated in Figure 4, but by means of the latching lugs 203 instead of pusher lugs 180. As indicated in Figures 7 and 16, the rail segments 220 are mounted by nuts 150 for vertical reciprocation by means of screws 151 in a manner entirely similar to the continuous rails 85 shown in Figure 6. As best seen in Figure 16, a tilting rail section 221 is pivotally carried by each column of the plating section for replacing the movable rail segments 220 when the segments 220 are lowered to immerse a carrier into the associated plating cell.

When a pair of rail segments 220 are in "down" position, the carrier spanning structure 120 contacts a pair of V blocks similar to the blocks 225 shown in Figure 6, which are located on the top of the tanks on either side. These blocks center the carrier while it is in the "down" position, and also act as the electrical contact for supplying the work with a negative potential to cause the work to act as the cathode in the plating operation. The V blocks are insulated from the tank by an insulating material underneath, and electrically connected to the negative terminal of a D.C. generator through suitable bus bars. Conforming anodes such as shown at 112 in Figure 1c are suspended from metallic bars which are also insulated from the tank and are electrically connected to the positive terminal of the D.C. generator through suitable bus bars. A metallic conductor 120b, Figures 6 and 7, comprises that part of the carrier bridging member 120 which rests in the V blocks. The conductor 120b is insulated from but secured to the carrier gudgeons 120a, and a metallic rack 227 is electrically connected to the conductor 120b and supported therefrom. Current from the generator is conducted from the V blocks through the conductor 120b and rack 227 to the work which is carried by the rack, and through the electrolyte to the anode and thence to the positive terminal of the generator.

As mentioned previously, the work remains in one of the plating cells for a period of 30 minutes. Thus, after the work has remained in cell 46a for 30 minutes, the rail segments 220 associated with cell 46a are raised to the up position. When the carrier is raised slightly above the V blocks 225, the plating circuit is broken and electroplating action ceases. During the 30 minutes plating treatment in cell 46a, it will be understood that cells 46b through 46p have been filled, the precleaning section delivering a carrier each two minutes. When the carrier from cell 46a is raised, the conveyor 89 moves the carrier to the end of the plating line, and at the same time another carrier from the precleaning section is pushed over cell 46a and lowered to the "down" position as previously described. It will be appreciated that since the movable rail sections 220 associated with each of the plating cells 46b to 46p is in "down" position when the carrier from cell 46a is to be removed, that the tilting rail sections 221 shown in Figure 16, must all be in place over cells 46b through 46p.

The detailed construction of the columns 80, nuts 150 and tilting rail sections 221 of the illustrated embodiment is shown in detail in Figures 16, 17 and 18. The columns 80 each comprise a pair of upright channel members 230. Secured at the inner sides of the channel members are angles 231 which as seen in Figure 6 extend from a point below the top of the tanks to near the top of the column. These angles 231 provide vertical tracks with upper rollers 233 and lower rollers 234 riding on one side of the vertical tracks 231 and lower rollers 235 riding on the opposite side. Rollers 233 are carried with the nuts 150 by means of brackets 236 secured to vertical plate portions 150a of the nuts 150, and similarly the lower rollers 234 are mounted on the vertical plate portions 150a by means of brackets 239. From Figure 18, it will be observed that the rollers 235 are mounted on the vertical plate portions 150a by means of brackets 240, the rollers projecting through recesses 150b in the plate portion 150a.

As seen in Figures 16, 17 and 18, the tilting rail of each nut has a recess 150d across the inner edge for receiving the movable track section 220. The portion 150c is reinforced centrally by a boss 150e which has a threaded aperture for receiving the vertical screw 151.

As seen in Figures 16, 17 and 18, the tilting rail assembly 250 comprises a pair of side members 251 pivotally secured by means of hubs 252 and nuts 253 to the opposite sides of the column 80. The side pieces 251 have upwardly and rearwardly curving members 255 which are joined by a cross piece 256 at their rear ends. The side pieces 251 also carry depending portions 258, Figure 16, which project below the side pieces and abut the horizontal plate portion 150c of the nut 150 when the nut is in its raised position. As the nut is lowered, it will be apparent that the tilting track assembly 250 will lower with it until the cross piece 256 abuts against the rear of the column 80 just above the strip 260, Figure 17, at which time the side piece 251 will rest on angle members 262, Figure 16, projecting laterally from the column 80 on either side. The tilting rail sections 221 will thus be adequately supported in alignment with the remainder of the track sections 97 of the plating section.

As indicated in Figures 16 and 17, counterweight means may be employed to aid in raising the nuts 150. This counterweight means may each include a sprocket 290, and a chain 291 including an end portion 291a for attachment to the nut 150 and an end portion 291b for extending within the column 80 and for attachment to a suitable counterweight, the counterweight being guided within the channels 230 of the column 80 by means of strips 293, Figure 18.

*Operation of copper plating section*

The operation of the copper plating section will now be readily understood and may be summarized as follows:

Referring to Figure 8, when the rails 85 are in the up position the pusher lugs 180′ engage the carrier 114 on each side thereof. When the precleaning conveyor is energized, pusher lugs 180′ move this carrier 114 toward the copper plating section and during this movement, the plating conveyor is energized. Latching lugs 203 are then moved at a greater speed than pusher lugs 180′ and take control of the carrier to position the same at the desired plating cell.

If the incoming carrier is to be positioned at cell 46a, the latching lugs 203 will travel a distance to accomplish this, and the outgoing carrier whose work has been immersed in cell 46a will travel a corresponding distance along the tracks 97. Thereafter the incoming carrier is lowered by movable rail sections 220 into cell 46a, and the plating conveyor is again energized to move the outgoing carrier to the second cleaning section over the fixed rail sections 222 and tilting rail sections 221.

*Timing schedule for copper plating section*

An exemplary timing schedule for the copper plating section might be as follows:

With a carrier positioned with its work immersed in cell 46a of the copper plating section, a cam timer, for example, might after the thirty-minute treatment period close a pair of contacts for 15 seconds to energize the elevator motor associated with cell 46*a* to raise the work above cell 46*a*. At this point, the entering carrier is above tank 45 as shown in Figure 8, and pre-cleaning conveyor 86 is energized in the forward direction for an eight foot stroke; toward the end of this stroke, plating conveyor 89 may be energized for 3.72 seconds to move a latching lug 203 from the position shown in Figure 8 adjacent sprocket 200, to a position directly over cell 46*a* of the copper plating section. The departing carrier, of course, is moved a corresponding distance along plating tracks 97 which may be eight feet and stops when the conveyor 89 is stopped at the end of the 3.72 seconds, and may then be positioned over cell 46*b*.

Now, the timer would close a further pair of contacts for 15 seconds to cause track sections 220 of cell 46*a* to be lowered to immerse the entering work. Thereafter, the timer would energize the plating conveyor for 55.80 seconds to move the departing carrier to a position against stop 300 in Figure 19 ready for transfer to the second cleaning section.

If it requires 3.72 seconds for the plating conveyor 89 to move the distance between cells, which may be eight feet, it will be appreciated that when the second plating cell 46*b* is to receive a new piece of work, the plating conveyor will be energized for twice 3.72 seconds or for 7.44 seconds to bring the entering work to cell 46*b*. Similarly, since the departing carrier has traveled for 7.44 seconds and is thus over cell 46*d*, after the entering carrier has been lowered to immerse its work in cell 46*b* the plating conveyor is energized for a period 7.44 seconds less than previously, i.e. 55.80 seconds minus 7.44 seconds, or 48.36 seconds, to convey the departing carrier to the transfer position at stop 300 in Figure 19.

Correspondingly, the conveyor is initially energized for three times 3.72 seconds or 11.16 seconds to deliver new work to cell 46*c*. Since the departing carrier stops above cell 46*f* (the sixth cell) and has ten cells still to cross and an additional eight feet from cell 46*p* (the sixteenth cell) to the transfer position at stop 300, Figure 19, the carrier must be reenergized for eleven times 3.72 seconds, or 40.92 seconds to discharge the departing carrier.

With the eighth cell 46*h*, the conveyor need be reenergized for only 3.72 seconds to discharge the departing carrier, since the departing carrier will travel from cell 46*h* to cell 46*p* as the new carrier is moved to cell 46*h*.

For discharging carriers from cells 46*i* to 46*p*, the conveyor is energized for a sufficient period in delivering the new carrier to discharge the departing carrier without any reenergization thereof after the work of the new carrier is immersed.

*Transfer from plating to second cleaning section*

Figure 19A:
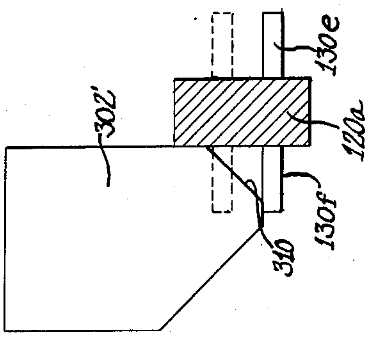
Figure 19*a* is a fragmentary diagrammatic illustration of the manner in which the first pusher lug of the second shuttle actuates the carrier positioning lock to released position.
Figure 19:
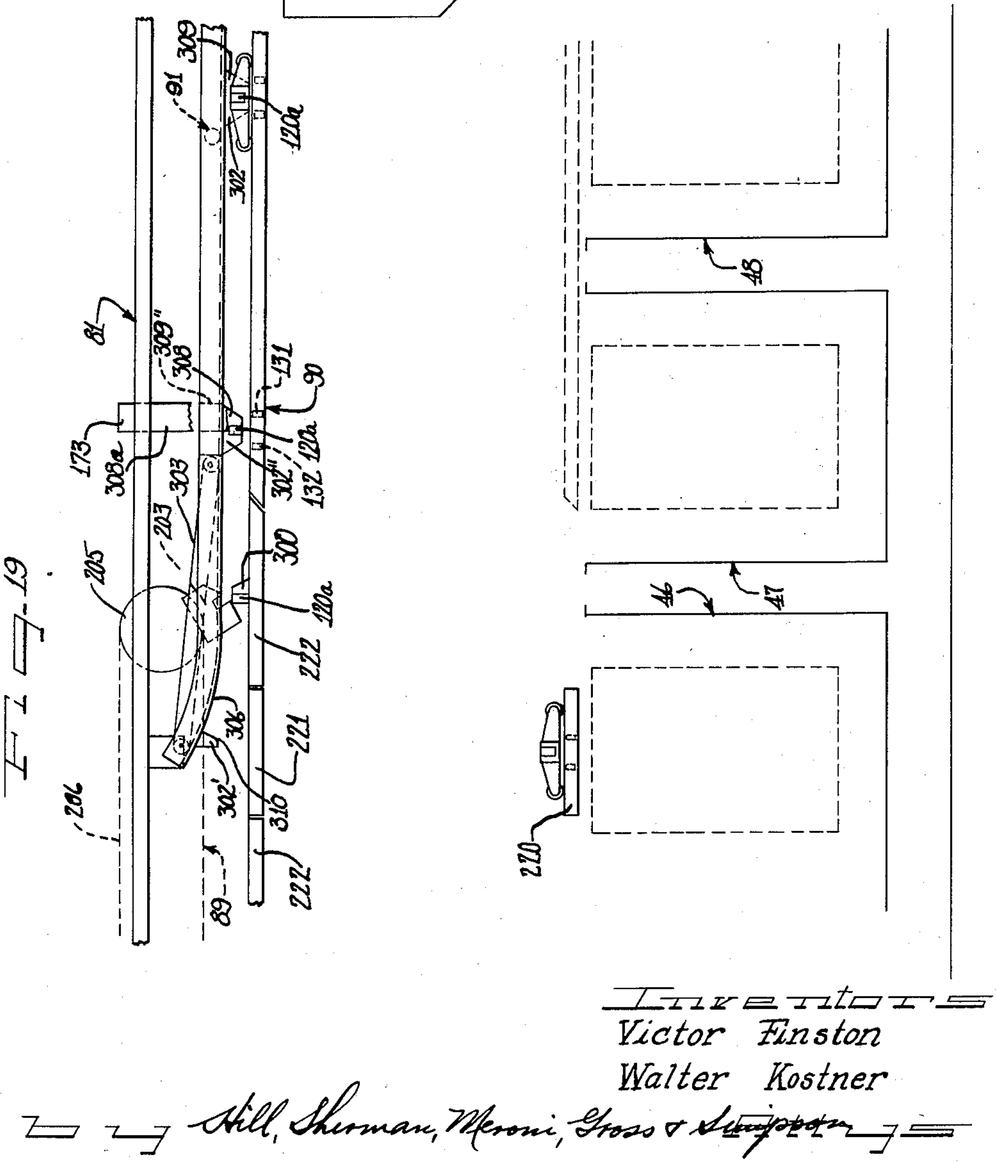
Figure 19 is a diagrammatic side elevational view illustrating the manner of transfer of work from the copper plating section to the second cleaning section.

Figure 19 illustrates in detail the transition from the copper plating section to the second cleaning section. The conveyor 89 of the plating section moves the carrier to the stop dog 300 at the end of the plating section, and the stop dog is effective to hold the carrier in this position on the stationary rail 222 until the carrier is taken up by the shuttle 91 and delivered to the first tank 47 of the second cleaning section.

Figure 15:
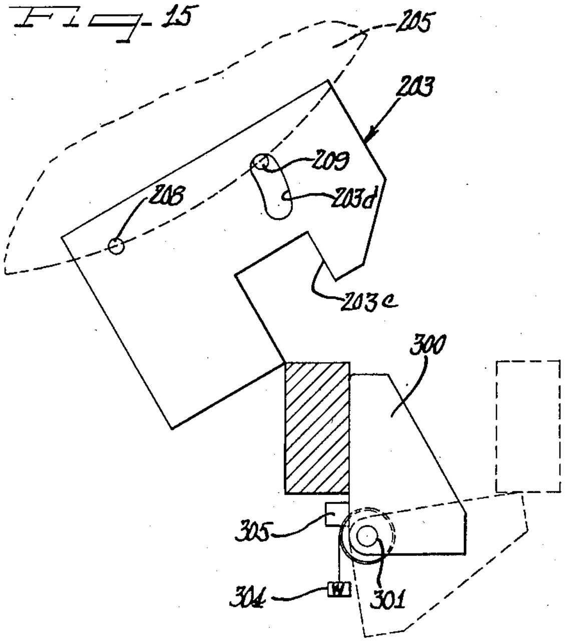
Figure 15 is a diagrammatic longitudinal sectional illustrating the operation of the stop dog at the end of the copper plating section.

The stop dog 300 is shown in detail in Figure 15, and it will be observed that the dog is pivoted at 301 and may be counter-balanced by means of a weight 304 and thus held in the position indicated in solid outline against the stop 305. By virtue of the counterweight, the stop dog is able to resist whatever momentum the carrier may have as it is delivered by the plating conveyor 89. However, the positive force of the shuttle 91 when it engages with the carrier is sufficient to overcome the bias of the stop dog and to move it into the position shown in dotted outline in Figure 15.

The timing of the conveyor 89 and shuttle 91 is such that the shuttle 91 is in its retracted position shown in Figures 2*c* and 19 as a carrier is delivered under the single pusher lug 302′ to the stop dog 300. When the shuttle 91 is next energized, the pusher lug 302′ will ride down the upwardly curved end of track 306 by means of a link 303 pivoted to the remainder of the shuttle 91 and engage the gudgeon 120*a* of the carrier positioned at the stop dog, and will move the carrier into position over the first cleaning tank 47. As indicated in Figure 19, a locking lug 308 identical to the locking lug 210 illustrated in Figures 11, 12 and 13, is provided above the center line of the tank 47, and the carrier gudgeon 120*a* is held between the pusher lug 302′ and the locking lug 308 just as illustrated in Figures 11 and 12 with respect to pusher lug 180′ and locking lug 210. By this means, the carrier is kept under control even though the lug 302′ has no companion lug.

In order to provide for the by-passing of the locking lug 308 by the second pusher lugs 302″, 309″ on the shuttle 91 in Figure 19, the end pusher lug 302′ is carried on the inner side of the shuttle link 303 just outside of the path of the latching lugs 203, while the second pusher lugs 302″, 309″ are outwardly of the pusher lug 302′ and the cooperating locking lug 308. In other words, the lug 302″ and lug 309″ (shown partly broken away in Figure 19) are in front of locking lug 308, as viewed in Figure 19. The locking lug 308 is mounted by means of strap 308*a* from cross beam 173.

Since the carrier locks 130 are released when the carrier is deposited at stop dog 300 in Figure 19, the pusher lug 302′ must be adapted to press the extension 130*f* of the carrier lock to down position as it takes control of the carrier. To this end, the lug 302′ is provided with a leading cam face 310 best seen in Figure 19*a*. The position of the pusher lug 302′ along the length of the extension is indicated diagrammatically in dotted outline in Figure 4. It will be understood that the relative position of the pusher lugs 302″, 309″ corresponds to that indicated for lug 180 in Figure 4.

*Operation—transfer from plating second cleaning section*

Thus, referring to Figure 19, it will be understood, that a carrier is positioned against stop dog 300 by conveyor 89, and that thereafter shuttle lug 302′ moves the carrier to locking lug 308. The lug 302′ moves the carrier lock 130 to unlatched position as indicated in Figure 19*a* by means of cam face 310. As rail 90 is lowered, the carrier lock pivots to latched position between brackets 131 and 132.

The shuttle 91 then returns to the position shown in Figure 19, and as the rail 90 ascends, pusher lugs 302″, 309″ release the carrier lock 130 for transfer of the carrier to the next tank 48.

*Second cleaning section*

The structure and operation of the second cleaning section, other than as described immediately above, is similar to that of the first cleaning section and need not further be described.

*Nickel plating section*

After the last tank of the second cleaning section has been reached, the carriers are fed into the nickel plating section which is identical to the copper plating section so far as the method of transferring the carriers is concerned, so that the operation through the nickel-plating section will be evident from the foregoing description.

*Final cleaning section*

The work enters this section in the same manner as described for the second cleaning section, and the operation in the final cleaning section will therefore be readily understood from the foregoing description of the second cleaning section.

*Unloading*

As will be understood by reference to Figure 2*d*, when the movable rails 99 of the final cleaning section descends, the last carrier which has been immersed in tank 63, and thereafter advanced to the end of rails 99, is manually pushed off the rails 99 and onto the stationary rail 315 of the unloading station 66. A carrier will be discharged from the final cleaning section in this manner every two minutes.

Although a specific embodiment of the invention has been here illustrated and described, it will be understood that various modifications in the construction may be made without a departure from the spirit and scope of the invention as indicated by the appended claims.

As a second embodiment of an electric control circuit for the first machine described herein, the plating conveyors such as 89 in Figures 2*b* and 2*c* are provided with a limit switch having a pair of normally closed contacts and a pair of normally open contacts, and the conveyor 89 operates the limit switch each time it has moved a distance equal to the separation between adjacent plating cells. If the pushers 203 are separated by this distance, the pushers may be disposed to each actuate the limit switch as they travel past a fixed position at the upper run of the chain 206. A stepping relay is employed having a cocking coil for cocking the relay stepping mechanism and a stepping coil for releasing the stepping mechanism when energized to cause the relay to index one position. Thus, with the conveyor 89 at rest in an indexed position, the cocking coil of the stepping relay would be energized due to closure of the normally open contacts of the limit switch. When the plating shuttle 89 begins to move and leaves its indexed position, the limit switch would be released to open the normally open contacts and to close the normally closed contacts energizing the stepping coil of the stepping relay.

By way of example, the operation for a six cell plating section with a conveyer such as 89 might be somewhat as follows:

During a first advance of the clean shuttle 86, while the lug 180′ in Figure 8 is moving a carrier onto the track 222, the plating conveyor 89 would be indexed once to take control of the incoming carrier and position it on #1 elevator rail 220 of Figure 8. The #1 rail may now be lowered and the #6 elevator rail 220 in Figure 19 will be raised. The plating conveyor 89 is now indexed once again to move the outgoing carrier from the #6 plating cell position in Figure 19 to a position against the stop 300 ready for transfer to the rinse section upon advance of the rinse shuttle including the lug 302′.

During the second advance of the clean and rinse shuttles, the plating conveyor 89 indexes once to move the pusher lug 203 in Figure 8 into engagement with the incoming carrier, and the plating conveyor then indexes five more times to move the incoming carrier onto the rail section 220 associated with the sixth plating cell in Figure 19. This might cause a 41 position stepping relay to step from position #3 to position #9 before the plating shuttle 89 was stopped.

At position #9 of the stepping relay, the #6 plating rail 220 in Figure 19 would be lowered and the #5 plating rail would be raised. Thereafter, the plating conveyor would be indexed twice to move the outgoing carrier against the stop 300 in Figure 19, the stepping relay moving to position 11.

During the third advance of the clean and rinse shuttles, the plating conveyor 89 would be indexed once to move the latching lug 203 in Figure 8 into engagement with the incoming carrier and then indexed four more times to move the carrier to the #5 plating station. The stepping relay would now be at position 16 to cause the #5 elevator rail to lower and the #4 plating elevator rail to raise. The plating conveyor 89 would now be indexed three times to move the outgoing carrier against the stop 300 in Figure 19, the stepping relay moving to position 19 to stop the plating conveyor.

This cycling would continue so that after the sixth advance of the clean and rinse shuttles, the latching lug 203 of Figure 8 would be indexed once to engage the carrier and indexed once again to move the carrier to the rail 220 over the second plating unit in Figure 8. The stepping relay would now be at position 37 to cause the #2 elevator rail to lower and the #1 elevator rail to raise. The plating conveyor 89 would now be indexed six times to move the outgoing carrier from the #1 plating cell against the stop 300.

This would cause the stepping relay to step through its 42 positions and back to position 1.

During the seventh advance of the clean and rinse shuttles, the plating conveyor would be indexed once to position the incoming carrier on the #1 elevator rail 220 and this rail would then be lowered and the #6 rail in Figure 19 would be raised. The plating conveyor 89 would now be indexed one position to move the outgoing carrier against the stop 300 and to move the stepping relay to position #3, after which the cycle would be repeated.

Although several specific embodiments of the invention have been illustrated and described, it will be understood that various modifications in the illustrated constructions may be made without a departure from the spirit and scope of the invention as indicated by the appended claims.

The present application is a continuation-in-part of our copending application Serial No. 377,218 filed August 28, 1953, now abandoned.

We claim as our invention:

1. In a processing machine, a framework, a series of adjacent treatment stations, track means supported on said framework and extending longitudinally along said series of treatment stations on each side thereof, work carriers spanning between said track means and having rollers for riding on said track means for supporting work carriers as they are moved along said track means between successive stations, conveyor means mounted on said framework and extending along said series of treatment stations at a fixed upper level and engageable with the work carriers on said track means for moving said carriers along said track means while said work carriers are supported by means of said rollers on said track means, said track means comprising movable track segments at each side of each of the stations of said series, means mounting the track segments at the respective sides of each station for movement to deposit work carriers at the respective stations in sequence and to remove work carriers from the respective stations in sequence, the track segments at each station being movable from an upper level with a work carrier spanning the track segments in engageable relation to said conveyor means and having its work above the associated station to a lower level with the work carrier disengaged from said conveyor means and having its work deposited at said station, and automatically operable track replacement means for completing said track means above each station at said upper level and accommodating movement of successive work carriers by said conveyor means along said track means above and past the work carrier remaining at said station, to thereby accommodate depositing of a succeeding work carrier at a station of said series beyond the station at which a preceding work carrier is deposited.

2. The processing machine of claim 1 wherein said track means comprises intervening fixed track sections mounted on said framework and interposed between and connecting said movable track segments in upper position thereof to define a continuous track along said series of stations, and said conveyor means being operable to move work carriers along said movable track segments and the intervening fixed track sections in transferring said work carriers along said series of treatment stations.

3. The processing machine of claim 1 wherein control means automatically coordinates operation of said conveyor means and said movable track segments to cause said conveyor means to move work carriers off of the respective track segments by which they are removed from the respective stations in successive cycles and to deliver new work carriers to the respective track segments while the track segments remain at said upper level.

4. The processing machine of claim 1, wherein said treatment stations comprise a series of closely adjacent tank units with substantially equal center-to-center spacing, said tank units each having anodes therein which are disposed to generally conform to the contour of the work and consequentially confine the work to prevent horizontal movement thereof.

5. In a processing machine, a series of treatment stations, an elongated framework extending along said stations, track means mounted on said framework and extending longitudinally along said series of treatment stations, means carried by said framework mounting a first part of said track means extending along a first section of said series of treatment stations for movement from a lower position to an upper position to move work carriers on the first part of said track means from a lower position with the work at the respective stations to an upper position with the work free of the stations, first conveyor means mounted on said framework and extending horizontally along said first part of said track means for engaging said work carriers in upper position of said first part of said track means and movable to advance said carriers along the first part of said track means between successive stations of said first section, said track means having a second part thereof extending along a second section of said stations and aligned with said first part of said track means in upper position of said first part of said track means to receive work carriers therefrom, said second part of said track means comprising movable track segments and intervening fixed track sections mounted on said framework and interposed between and connecting said movable track segments to define a continuous track along said second section of stations in upper position of said movable track segments, means mounting the movable track segments at the respective treatment stations of said second section for movement from a lower position with the movable track segments below said intervening fixed track section to an upper position with the movable track segments at the level of said intervening fixed track sections, second conveyor means mounted on said framework and extending along said second part of said track means and engageable with work carriers on said movable track segments in upper position thereof for moving said carriers along said movable track segments and the intervening fixed track sections, said second conveyor means being automatically disengaged from carriers which are moved downwardly with said movable track segments, and said second conveyor means being operable independently of said first conveyor means to move carriers to a variable position along said second part of said track means in each cycle of said first conveyor means, and automatically operable means for completing said second part of said track means above each station at the level of said intervening fixed track sections and accommodating movement of a succeeding work carrier above and past a work carrier deposited at said station in a succeeding cycle of said first conveyor means to thereby accommodate depositing of work carriers at the stations of said second section for a longer time period than the time period during which the work carriers remain deposited at the treatment stations of said first section.

6. In a processing machine, a first section comprising a first series of treatment stations, a second section comprising a second series of treatment stations, an elongated framework extending along said sections, first track means extending longitudinally along said first series of stations on each side thereof, means carried by said framework mounting said first track means for movement from a lower position to an upper position, work carriers spanning between said first track means on either side of said treatment stations and movable with said first track means from a lower position with work at the respective stations to an upper position with work free of said stations, first conveyor means carried by said framework and extending horizontally at a fixed upper level for engaging said work carriers in upper position of said first track means and movable to advance said carriers between successive stations, said first conveyor means being disengaged from said carriers by downward movement of said carriers with said first track means, second track means extending longitudinally along said second series of treatment stations on each side thereof, work carriers spanning between said second track means on either side of said treatment stations, said second track means comprising movable track segments at each side of each of said stations of said second series of stations, individually operable means mounting the track segments at the respective sides of each station for joint movement independently of the track segments at other stations of said second series from a lower position with a work carrier spanning between the track segments having its work at said station to an upper position with the movable track segments at the level of said first track means and the work carrier having its work clear of said station, second conveyor means carried by said framework and extending along said second track means at a fixed upper level and engageable with work carriers on said movable track segments in said upper position of the track segments for moving said carriers along said second track means, said second conveyor means being disengaged from carriers which are moved downwardly with said movable track segments, and replacement track portions mounted by said framework along said second track means at each side of each of said second series of stations adjacent the upper positions of the respective movable track segments and movable to replace the respective movable track segments as the movable track segments move downwardly from their upper positions.

7. In a processing machine, a first section comprising a first series of treatment stations, a second section comprising a second series of treatment stations, first track means extending longitudinally along said first series of treatment stations on each side thereof, means carried by said framework mounting said first track means for movement from a lower position to an upper position, work carriers spanning between said first track means on either side of said treatment stations and movable with said first track means from a lower position with work at the respective stations to an upper position with work free of the stations, first conveyor means carried by said framework and extending horizontally at a fixed upper level for engaging said work carriers in upper position of said first track means and movable to advance said work carriers between successive stations of said first series, said first conveyor means being disengaged from said carriers by downward movement of said carriers with said first track means, second track means extending along said second series of treatment stations on each side thereof for receiving work carriers from said first track means, said second track means comprising movable track segments at each side of each of the stations of said second series, means mounting the track segments at the respective sides of each station for movement independently of the track segments at the other stations of said second series to deposit work carriers at the respective stations in sequence and to remove work carriers from the respective stations in sequence, the track segments at each station being movable from a lower position with a work carrier spanning the track segments having its work at the associated station to an upper position with the track segments at the level of said first track means and with the work carrier having its work clear of said stations, second conveyor means carried by said framework and extending along said second track means at a fixed upper level and engageable with work carriers on said movable track segments in said upper position thereof for moving said carriers along said second track means, said second conveyor means being disengaged from carriers which are moved downwardly with said movable track segments, and means for automatically completing said second track means above each station of said second series while a work carrier remains at said station and accommodating movement of succeeding work carriers along said second track means above and past said work carrier remaining at said station to thereby accommodate depositing of a succeeding work carrier at a station of said second series beyond said station at which a preceding work carrier has been deposited.

8. In a processing machine, a first section comprising a first series of treatment stations, a second section comprising a second series of treatment stations, an elongated framework extending along said sections, first track means extending longitudinally along said first series of treatment stations, means carried by said framework mounting said first track means for movement from a lower position to an upper position to move work carriers on the first track means from a lower position with work at the respective stations to an upper position with the work free of the stations, first conveyor means carried by said framework and extending horizontally at a fixed upper level for engaging said work carriers in upper position of said first track means and movable to advance said carriers between successive stations of said first section, second track means extending along said second series of stations and aligned with said first track means in the upper position of the first track means to receive work carriers therefrom, said second track means comprising movable track segments, means mounting the track segments at the respective treatment stations of said second section for movement independently of the track sections at other stations of said second section to deposit work carriers at respective stations in sequence and to remove work carriers from respective stations in sequence, the track segments being movable from a lower position with a work carrier thereon having its work at the associated station to an upper position with the track segments at the level of said first track means and with the work carriers thereon having their work clear of said station, second conveyor means carried by said framework and extending along said second track means at a fixed upper level and engageable with work carriers on said movable track segments in upper position thereof for moving said carriers along said second track means, said second conveyor means being disengaged from carriers which are moved downwardly with said movable track segments, said first and second conveyor means overlapping to deliver carriers from said first track means to said second track means, and said second conveyor means being operable independently of said first conveyor means to move carriers to a variable position along said second track means in each cycle of said first conveyor means, and automatically operable track replacement means for completing said second track means at stations of said second series having work carriers deposited thereat to accommodate movement of succeeding work carriers above and over the work carriers deposited at said stations of said second series in preceding cycles of said second conveyor means.

9. The machine of claim 8 wherein stop means defines a carrier stop position at the junction between said first and second conveyor means and is operative to hold an incoming carrier at said stop position at the end of an advance of said first conveyor means, said stop means being operative to release the incoming carrier upon advance of said second conveyor means to move the incoming carrier along said second track means.

10. In a processing machine, a first section comprising a first series of treatment stations, a second section comprising a second series of treatment stations, an elongated framework extending along said sections, first track means extending longitudinally along said first series of treatment stations, second track means extending longitudinally along said second series of treatment stations for receiving work carriers from said first track means, means carried by said framework mounting said second track means for movement from a lower position to an upper position, to move work carriers on the second track means from a lower position with work at the respective stations of said second section to an upper position with work free of said stations of said second section, first conveyor means carried by said framework and extending along said first track means at a fixed upper level and engageable with work carriers on said first track means in upper position thereof for moving said carriers along said first track means, second conveyor means carried by said framework and extending longitudinally along said second track means and cyclically movable to advance said carriers between successive stations of said second section, said first track means comprising movable track segments at each of the stations of said first section, means mounting the track segments for movement independently of track segments at other stations of said first section to deposit work carriers at respective stations in sequence and to remove work carriers from respective stations of said first section in sequence, the track segments being movable from an upper position with the work carrier thereon having its work clear of the station to a lower position with the work carrier thereon having its work at the associated station, said first and second conveyor means overlapping to deliver carriers from said first track means to said second track means, and said first conveyor means being operable independently of said second conveyor means to move carriers from successive stations of said first section over intervening stations of said first section to said second track means in each cycle of said second conveyor means, and said second conveyor means removing the work carriers delivered thereto from successive stations of said first section in successive cycles thereof, and means for automatically completing said first track means above said intervening stations of said first section and accommodating movement of outgoing work carriers above and past work carriers deposited at said intervening stations.

11. The machine of claim 10 wherein stop means defines a carrier stop position at the juncture between said first and second conveyor means and is operative to hold an outgoing carrier at said stop position when advanced thereto by said first conveyor means, said stop means being operative to release the outgoing carrier upon advance of said second conveyor means to move the outgoing carrier along said second track means.

12. In a processing machine, a first section comprising a first series of stations, a second section comprising a second series of stations, an elongated framework extending along said sections, first track means extending longitudinally along said first series of stations, means carried by said framework mounting said first track means for movement between a lower position with work carriers on said first track means having their work at the stations of said first section to an upper position with the work carriers having their work clear of said stations, first conveyor means carried by said framework and extending horizontally along said first track means and operating cyclically to advance work carriers on said first track means between successive stop positions in alignment with the respective stations of said first section, second track means extending longitudinally along said second series of stations, means for transferring carriers from said first track means to said second track means, said second track means comprising movable track segments at stations of said second section, means mounting the track segments at the respective stations for movement independently of the track segments at other stations of said second section to deposit work carriers at the respective stations in sequence and to remove work carriers from the respective stations in sequence, the track segments being movable from a lower position with a work carrier thereon having its work at the associated station to an upper position with the work carrier thereon having its work clear of said station, second conveyor means carried by said framework and extending along said second track means at a fixed upper level and engageable with work carriers on said movable track segments in upper position thereof for moving said carriers along said second track means, said second conveyor means being disengaged from carriers which are moved downwardly with said movable track segments, said second conveyor means being operable independently of said first conveyor means to move carriers to different positions along said second track means in successive cycles of said first conveyor means, individually operable means mounting the track segments at the respective stations for independent movement, said individually operable means for the respective stations being successively operable in successive cycles of said first conveyor means to deposit work carriers at successive stations of said second section in sequence, and means operable in each cycle of said first conveyor means to complete said second track means above said successive stations at which work carriers are deposited for accommodating travel of succeeding work carriers over and past the deposited work carriers.

13. The processing machine of claim 12 wherein said second track means comprises intervening fixed track sections mounted on said framework and interposed between and connecting said movable track segments in upper position of said movable track segments to define a continuous track along said second series of stations, said second conveyor means being operable to move carriers along said movable track segments and said intervening fixed track sections in upper position of the movable track segments to transfer the work carriers along said second series of stations.

14. In a processing machine, a first series of first work stations, a second series of second work stations, a framework extending along said first and second series of work stations, first elevator means carried by said framework and operating cyclically for raising work carriers from said first work stations in unison, first conveyor means carried by said framework and extending along said first stations for engaging work carriers supported by said first elevator means in raised position thereof, said first conveyor means operating cyclically to advance said work carriers in unison to the respective next succeeding stations of said first series each time said first elevator means is raised, second elevator means carried by said framework and operative to lower work carriers to successive ones of said second work stations in sequence in successive cycles of said first conveyor means, second conveyor means carried by said framework and extending along said second series of work stations, said second conveyor means being operable independently of said first conveyor means and being operative to engage work carriers supported by said second elevator means in raised position thereof, said second conveyor means being movable through successive different distances in successive cycles of said first conveyor means to advance successive work carriers discharged from said first series of work stations to successive positions along said second elevator means overlying successive ones of said second stations for delivering work carriers to said second stations in sequence as they are discharged from said first series of stations, and means operable in each cycle of said first conveyor means for accommodating travel of succeeding work carriers discharged from said first series of work stations over and past the work carriers deposited at said second stations.

15. The processing machine of claim 14 wherein said first and second series of work stations are disposed in closely spaced series relation, said second work stations being disposed in a straight line and comprising a series of closely adjacent tank units with a center-to-center spacing between tank units which is substantially equal throughout said second series, said tank units each having conforming anodes therein for disposition in close generally surrounding relation to the work immersed in said unit when a work carrier is deposited at the corresponding station, there being a sufficient number of tank units in said second series to provide a treatment time for work immersed in one of said units which is a substantial number times the treatment time of work at the stations of said first series.

16. In a processing machine, a first series of first work stations, a second series of second work stations, a framework extending along said first and second series of work sections, first elevator means carried by said framework and operative to raise work carriers from successive ones of said first work stations in sequence in successive work cycles, first conveyor means carried by said framework and extending along said first series of work stations, said first conveyor means being operable to engage work carriers supported by said first elevator means in raised position thereof and being movable for successive different distances in successive work cycles to advance successive work carriers raised from the respective first work stations to a discharge position, second conveyor means extending along said second series of work stations and operable in each work cycle to move a work carrier from said discharge position to a position over the first of said second work stations, said second conveyor means being operable in each work cycle to advance work carriers between successive work stations of said second series of work stations, and means automatically operable for accommodating travel of said successive work carriers over and past work carriers deposited at said first work stations as said successive work carriers are moved by said first conveyor means to said discharge position.

17. The processing machine of claim 16 wherein said first elevator means comprises movable track segments mounted on said framework for vertical reciprocation between a lower position and an upper position, and fixed track sections are mounted on said framework between successive movable track segments in upper positions thereof to provide a continuous track along said first work stations, said first conveyor means being operable to move work carriers along said movable track segments in upper position thereof and along said intervening fixed track sections with the work carriers supported on said movable track segments and fixed track sections in transferring work carriers along said first series of work stations.

18. The processing machine of claim 16 wherein control means automatically coordinates operation of said first elevator means, and said first conveyor means to raise a work carrier from one of said first work stations in each work cycle, moves the raised work carrier out of alignment with said one of said first work stations and moves a new work carrier into alignment with said one of said first work stations while said first elevator means remains in raised position.

19. A conveyor system comprising a track movable in a vertical plane and having carrier positioning means carried thereby, a work carrier mounted for travel along said track and having cooperating positioning means carried thereby for movement into engagement with said carrier positioning means carried by said track, conveyor means engaging said carrier in upper position of said track and operative to automatically release said positioning means as said track moves to said upper position, said positioning means being automatically movable into engagement as the track lowers the carrier out of engagement with the conveyor means;

20. In a processing machine, a framework, a conveyor carried by said framework and disposed at a fixed level and movable in a horizontal plane between a plurality of stop positions and having a pusher face, a carrier for engagement by said pusher face, track means carried by said framework for supporting said carrier for engagement by said pusher face, a pivotal stop carried by said framework and disposed to engage said carrier at a stop position of said conveyor, means carried by said conveyor in longitudinal alignment with said pivotal stop for engaging said stop to prevent pivotal movement thereof when the pusher face has moved a carrier to said stop position in proximity to said stop, whereby said carrier is positioned between said stop and said pusher face at a predetermined stop position along said track means.

21. In a plating machine, a pre-cleaning section comprising a first series of treatment baths, a plating section comprising a second series of treatment baths, and a second cleaning section comprising a third series of treatment baths, elongated framework extending along said sections, track means extending longitudinally along said first and third series of treatment baths on each side thereof, means carried by said framework mounting said track means for movement from a lower position to an upper position, work carriers spanning between said track means on either side of said treatment baths and movable with said track means from a lower position with work immersed in the respective baths to an upper position with work free of said baths, conveyor means carried by said framework and extending horizontally at a fixed upper level for engaging said work carriers in upper position of said track means and movable to advance said carriers between successive baths, movable track segments on each side of each of the baths of said second series of treatment baths, individually operable means mounting said track segments for movement from a lower position to an upper position, fixed track sections disposed at a fixed upper level for alignment with said track segments in upper position thereof to define therewith a continuous track along said second series of treatment baths, conveyor means carried by said framework and extending along said second series of treatment baths at a fixed upper level for moving carriers along said fixed track section and said movable track segments in upper position thereof, and replacement track portions pivotally carried by said framework and movable to replace the corresponding movable track segments as the track segments are lowered out of alignment with said fixed track sections.

22. In a plating machine, a plating tank, a framework adjacent said tank, a movable track segment mounted by said framework for vertical reciprocation in alignment with said tank from a lower position to immerse work in said tank to an upper position to clear work of said tank, fixed track sections disposed at an upper position and carried by said framework for receiving said movable track segment therebetween to form a continuous track in upper position of said movable track segment, and a replacement track portion mounted by said framework for movement to replace said movable track segment as the track segment is lowered from its upper position, said replacement track portion fitting between said fixed track sections and forming a continuous track therewith, whereby a first work unit may be immersed in said tank while succeeding work units are transported over said tank to a succeeding plating bath.

23. In an apparatus for treating work units by immersion in a series of treatment baths, a fixed track and a movable track for receiving work carriers in series therealong, means mounting said movable track for movement from a level to receive carriers from said fixed track to a level to clear the work and carrier of said treatment baths, and foot-operated stop means adjacent said fixed track for movement into and out of the path of movement of work carriers from said fixed track to said movable track and movable into the path of movement of said work carriers to prevent movement of a work carrier off the fixed track when said movable track is out of alignment with said fixed track.

24. In an apparatus for treating work by immersion in a series of treatment baths, an elongated movable track extending over a plurality of baths, a plurality of work carriers on said track supporting articles for immersion in said baths, a stationary frame, means mounting said track on said frame for movement from a level to immerse articles supported by said carriers on the track in the baths to a level to clear said articles of said baths, conveyor means mounted at a fixed level on said frame and engaging said carriers when the track is at said second mentioned level, means for shifting said conveyor means by the separation between baths to move said articles to successive baths, latching means operatively connected with said carriers and disposed along said track for cooperating to fix the positions of the carriers along the track when the track is at said first-mentioned level, and unlatching means operatively connected with said conveyor means to release said carriers from said latching means when the track is at said second-mentioned level preliminary to the shifting of said carriers along said track by said conveyor means.

25. In an apparatus for treating articles by immersion in a series of baths, a framework, an elongated track carried by said framework and extending over a plurality of baths and having movable sections aligned with the respective baths, means mounting said movable sections for movement from an upper position as a part of said track to a lower position for immersing articles supported from said sections in said baths, means carried by said framework and detachably engageable with articles supported on said track for moving articles along said track, and auxiliary track sections mounted by said framework for replacing said movable sections when said movable sections are moved to lower article immersing position.

26. In an automatic plating machine, a pre-cleaning section comprising a first series of treatment baths, a plating section comprising a second series of treatment baths, and a second cleaning section comprising a third series of treatment baths, an elongated framework extending along said sections including a pair of upright columns one on either side of each bath, a vertical guideway carried by each column, track support means movable along each of said vertical guidways, track means extending longitudinally along said first and third series of treatment baths on each side thereof and carried by said track support means, means for raising and lowering said track support means in unison along said vertical guideways to move said track means from a lower position to an upper position, work carriers spanning between said track means on either side of said treatment baths and movable with said track means from a lower position with work immersed in the respective baths to an upper position with work free of said baths, shuttle means for engaging said work carriers in upper position of said track means and advancing said work carriers to successive baths, track segments carried by each said track support means in said plating section, individually operated means for raising and lowering the pair of track support means associated with each bath of said plating section, a replacement track portion pivotally carried by each column and movable by gravity to replace the corresponding track segment as the track segment is lowered by its support means, fixed track portions interposed between adjacent track segments for providing continuous tracks extending along said plating section and for receiving work carriers from said pre-cleaning section and for delivering work carriers to said second cleaning section, and conveyor means mounted by said framework at said plating section for taking control of entering work carriers delivered from said pre-cleaning section by said shuttle means and for discharging departing work carriers into said second cleaning section, said raising and lowering means, said shuttle means, said individually operated means and said conveyor means being correlated and controlled to move work in unison through successive baths of said pre-cleaning section, to automatically transfer work from said pre-cleaning section to said plating section, to move work successively and sequentially to respective paths of said plating section, to thereafter sequentially and automatically discharge work to said second cleaning section and to move the work successively and sequentially through the baths of the second cleaning section.

References Cited in the file of this patent

UNITED STATES PATENTS

| | | |
|---|---|---|
| 679,824 | Betts | Aug. 6, 1901 |
| 2,048,937 | Larson | July 28, 1936 |
| 2,075,209 | Kuebler | Mar. 30, 1937 |
| 2,591,681 | Davis | Apr. 8, 1952 |
| 2,626,621 | Curtis | Jan. 27, 1953 |

OTHER REFERENCES

Canning: "Practical Handbook on Electroplating," 11th edition (1932), pages 96 and 97.